US008923639B2

(12) United States Patent
Sumitomo

(10) Patent No.: US 8,923,639 B2
(45) Date of Patent: Dec. 30, 2014

(54) IMAGE PROCESSING SYSTEM, IMAGE PROCESSING METHOD, AND PROGRAM

(75) Inventor: Hironori Sumitomo, Moriguchi (JP)

(73) Assignee: Konica Minolta Holdings, Inc., Tokyo (JP)

( * ) Notice: Subject to any disclaimer, the term of this patent is extended or adjusted under 35 U.S.C. 154(b) by 90 days.

(21) Appl. No.: 13/639,919

(22) PCT Filed: Apr. 13, 2011

(86) PCT No.: PCT/JP2011/059160
§ 371 (c)(1),
(2), (4) Date: Oct. 8, 2012

(87) PCT Pub. No.: WO2011/129361
PCT Pub. Date: Oct. 20, 2011

(65) Prior Publication Data
US 2013/0039595 A1    Feb. 14, 2013

(30) Foreign Application Priority Data
Apr. 15, 2010 (JP) ................................ 2010-093958

(51) Int. Cl.
*G06K 9/36* (2006.01)
*H04N 19/85* (2014.01)

(52) U.S. Cl.
CPC ............................. *H04N 19/00903* (2013.01)
USPC ............ 382/238; 382/232; 382/236; 382/239

(58) Field of Classification Search
USPC ............. 382/232, 236, 238, 239; 375/240.03, 375/240.17, 240.23, 240.25, 240.26, E7.14, 375/E7.145
See application file for complete search history.

(56) References Cited

U.S. PATENT DOCUMENTS

| 5,592,225 | A | * | 1/1997 | Kurobe | .................... 375/240.03 |
| 6,118,475 | A | | 9/2000 | Iijima et al. | |
| 7,274,825 | B1 | * | 9/2007 | Lee et al. | ...................... 382/239 |

(Continued)

FOREIGN PATENT DOCUMENTS

| JP | 06350952 | A | * | 12/1994 | ............. H04N 5/782 |
| JP | 7-325924 | A | | 12/1995 | |
| JP | 2004-301607 | | | 10/2004 | |
| JP | 2006-284372 | A | | 10/2006 | |

OTHER PUBLICATIONS

Seno, Takanori, "3D Kanren no MPEG Hyojunka Doko," Image Lab, dated Feb. 1, 2007, vol. 18, No. 2, p. 14, Shisa Vector Yosoku.

(Continued)

*Primary Examiner* — Anh Do
(74) *Attorney, Agent, or Firm* — Brinks Gilson & Lione

(57) ABSTRACT

It is an object to reduce a computation related to a detection of a corresponding point intended for a compressed dynamic image. In order to attain the object, there are acquired first and second compressed dynamic images including a reference frame and a prediction frame with each pixel indicated by motion information based on the other frame respectively. Moreover, there is executed a detection processing for detecting a corresponding point which corresponds to each reference point of one frame contained in the first compressed dynamic image from one frame contained in the second compressed dynamic image by causing each set of frames between said first compressed dynamic image and said second compressed dynamic image to be a target. The detection processing intended for a set of prediction frames is executed by using the motion information indicative of the set of prediction frames.

15 Claims, 31 Drawing Sheets

(56) References Cited

U.S. PATENT DOCUMENTS

| | | | |
|---|---|---|---|
| 7,643,559 B2 * | 1/2010 | Kato et al. | 375/240.23 |
| 8,385,423 B2 * | 2/2013 | Kotaka et al. | 375/240.17 |
| 2006/0222238 A1 | 10/2006 | Nishiyama | |

OTHER PUBLICATIONS

International Search Report in International Application No. PCT/JP2011/059160, mailed May 24, 2011, 1 p.

* cited by examiner

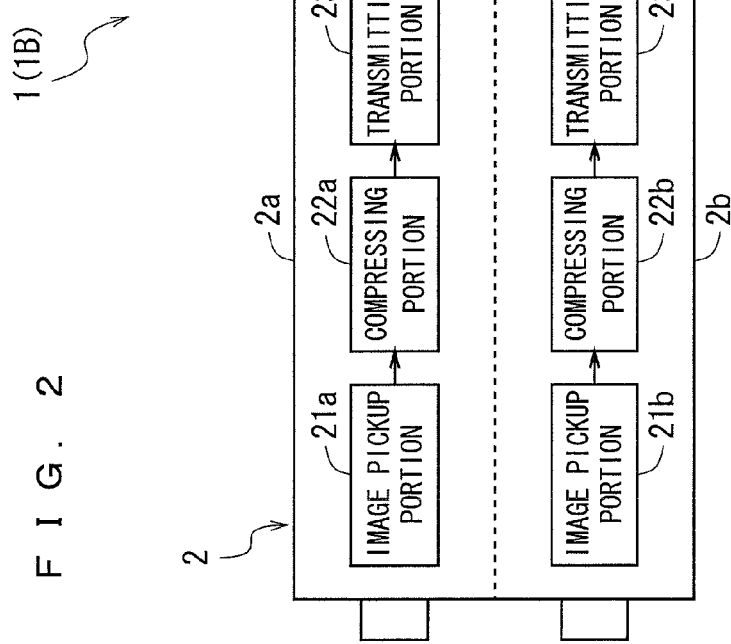

F I G. 5
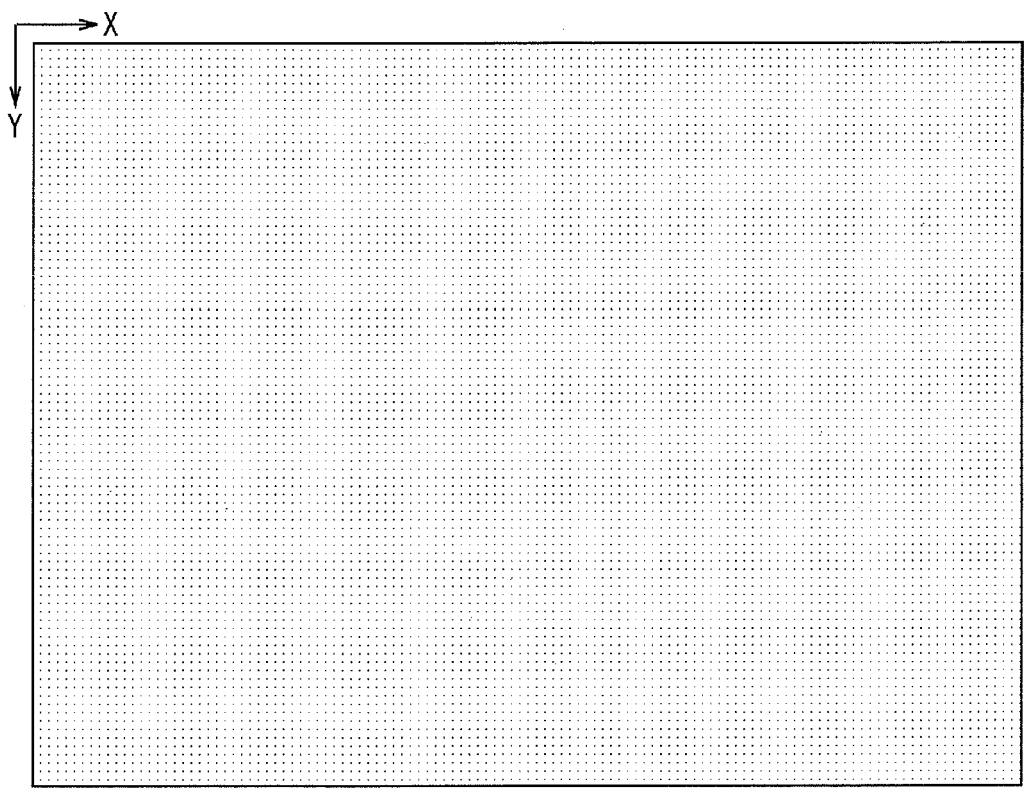
F I G. 6
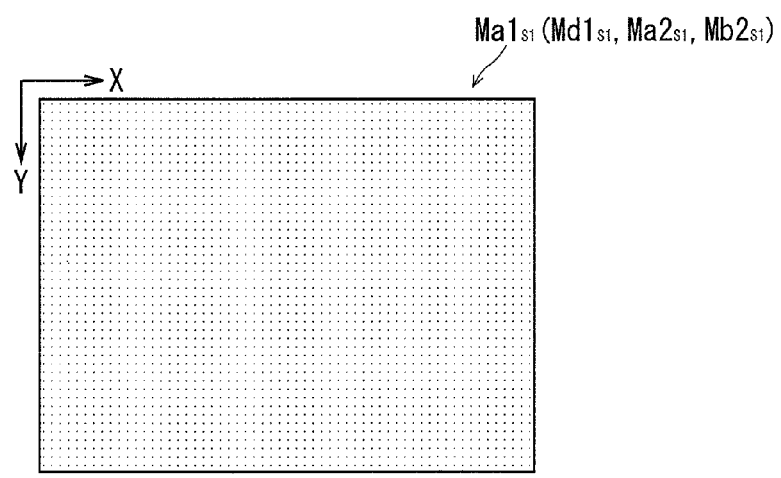

F I G . 1 5
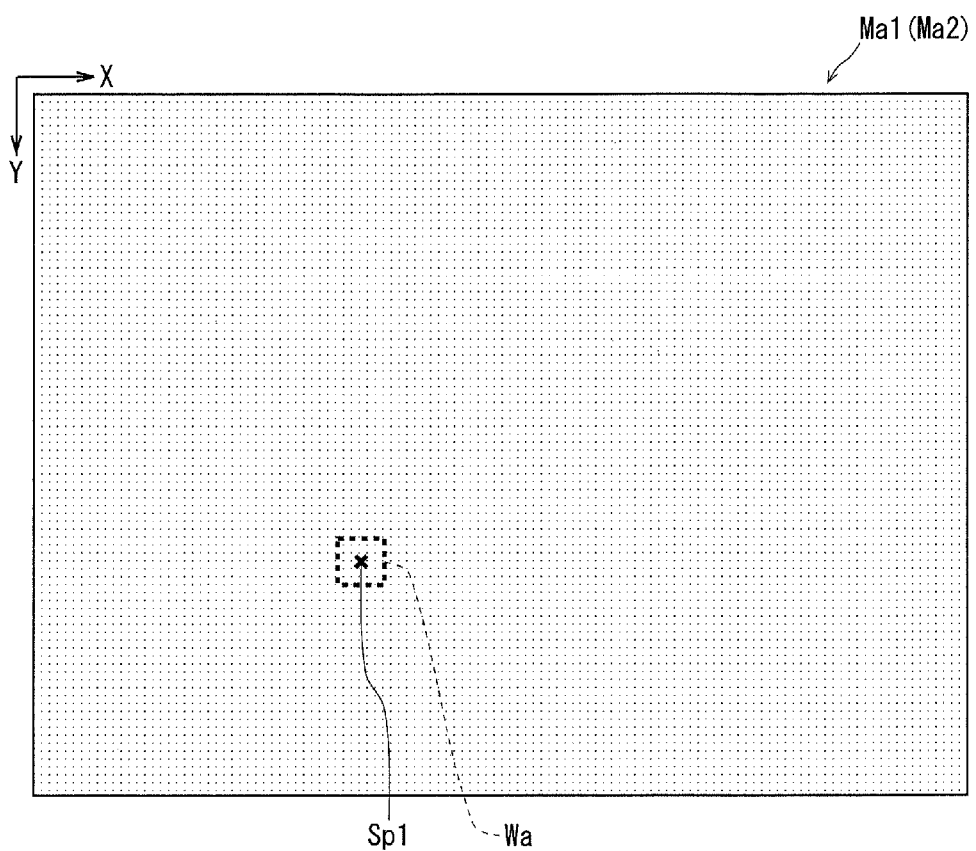

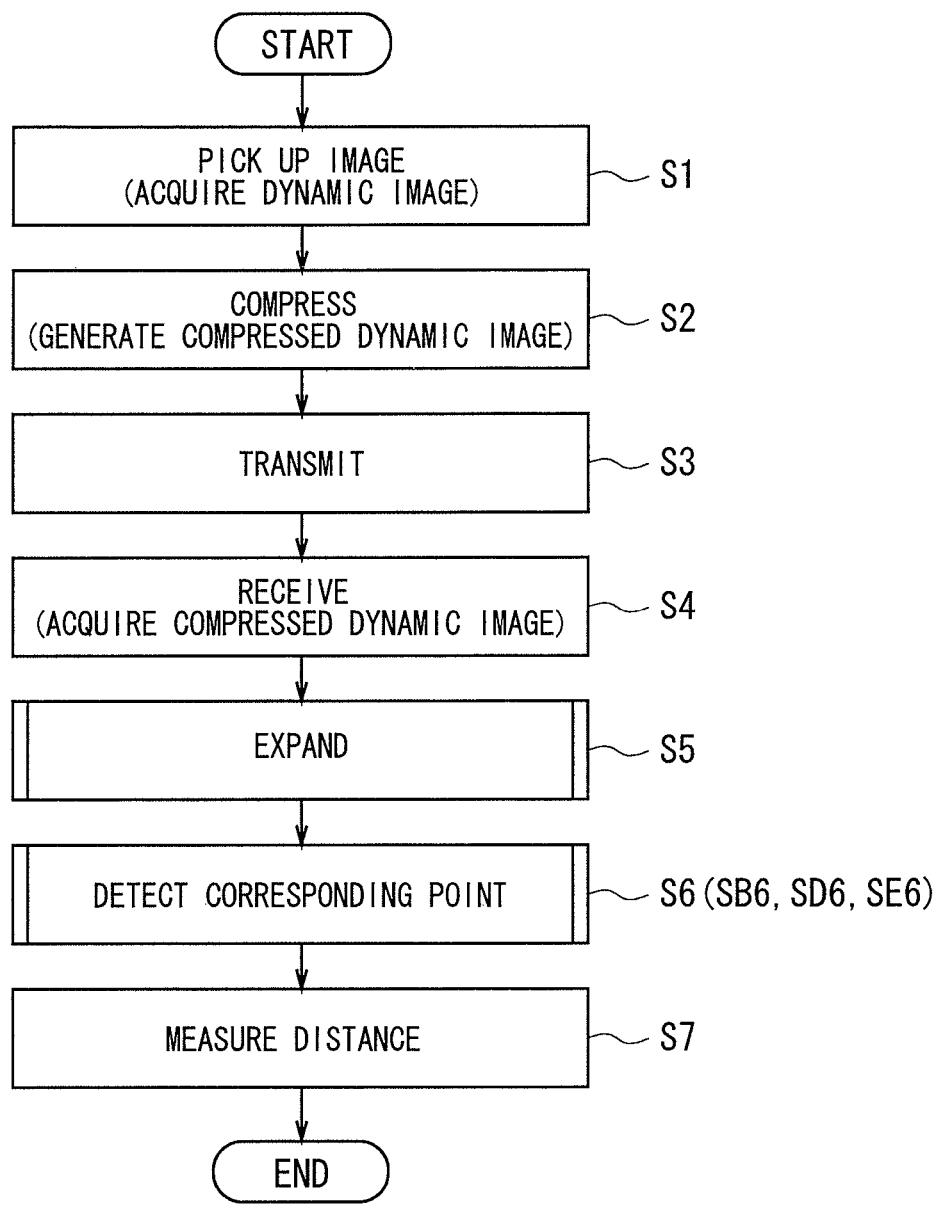
F I G . 2 2

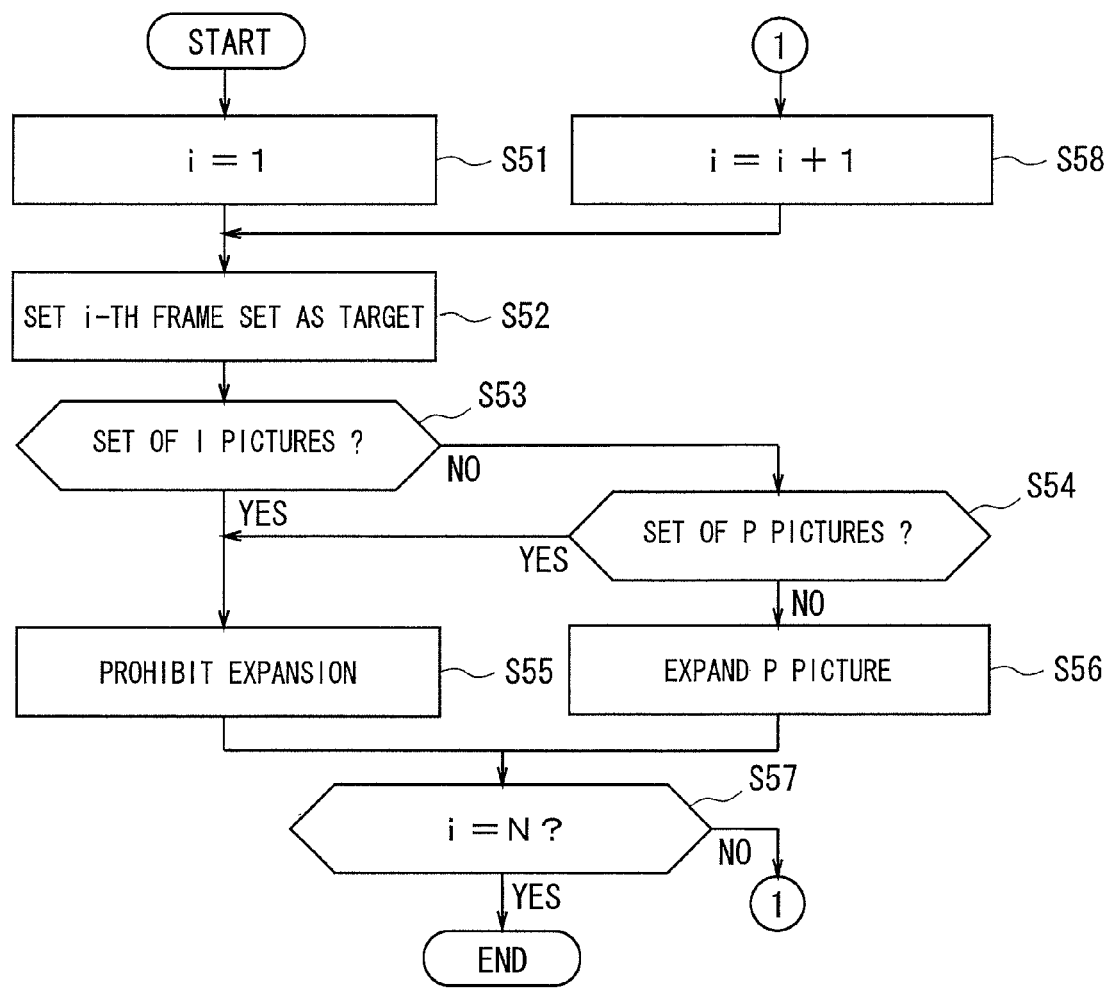
F I G . 2 3

F I G. 2 7
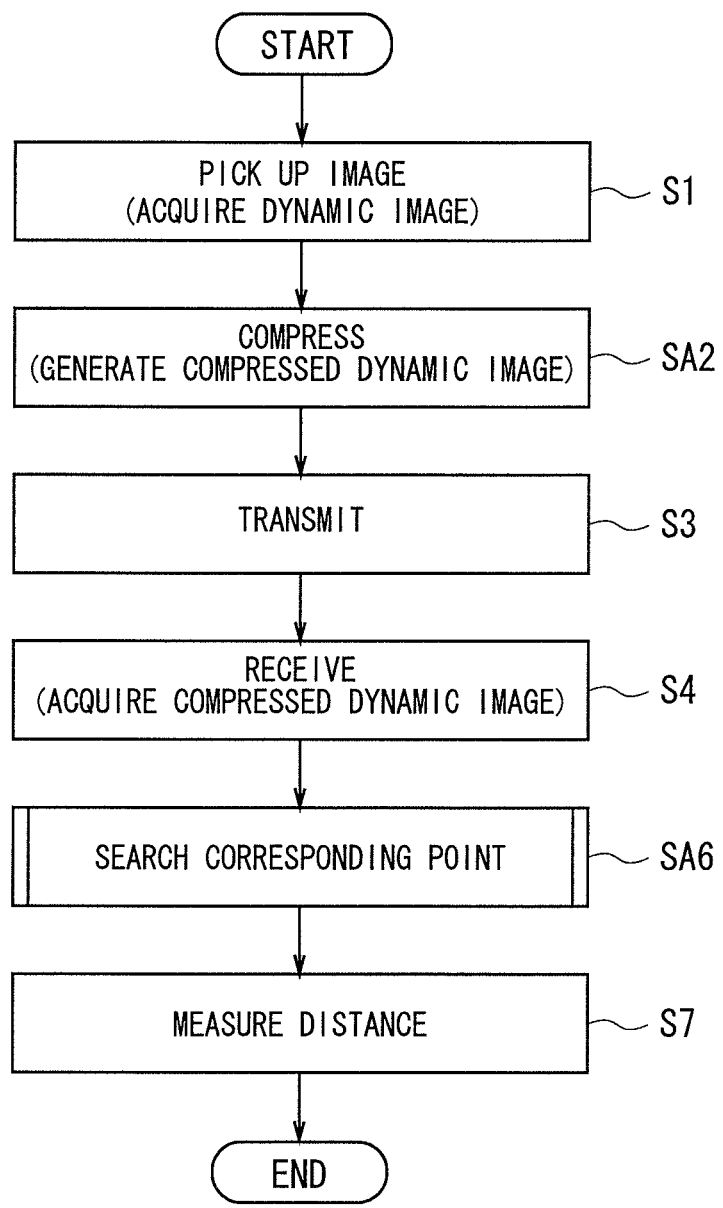

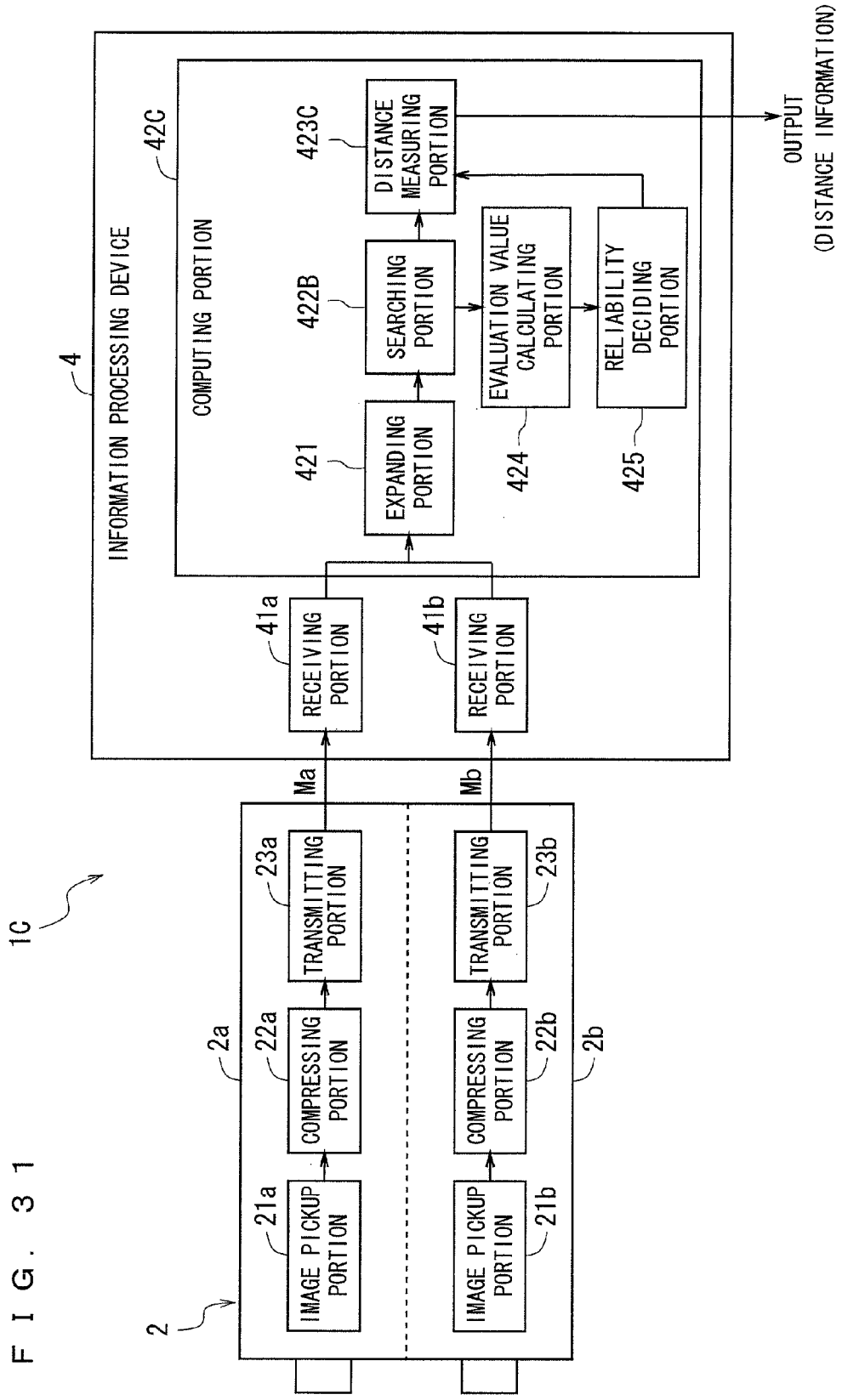

F I G. 3 2
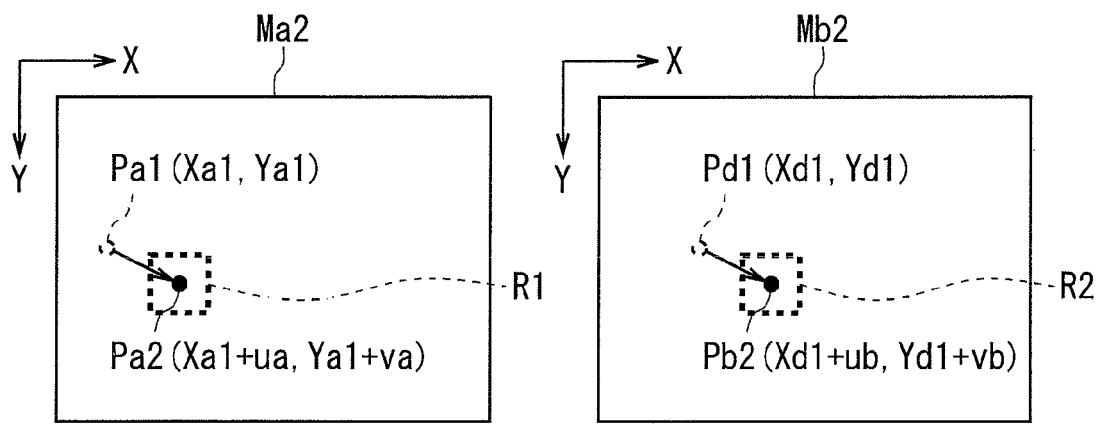

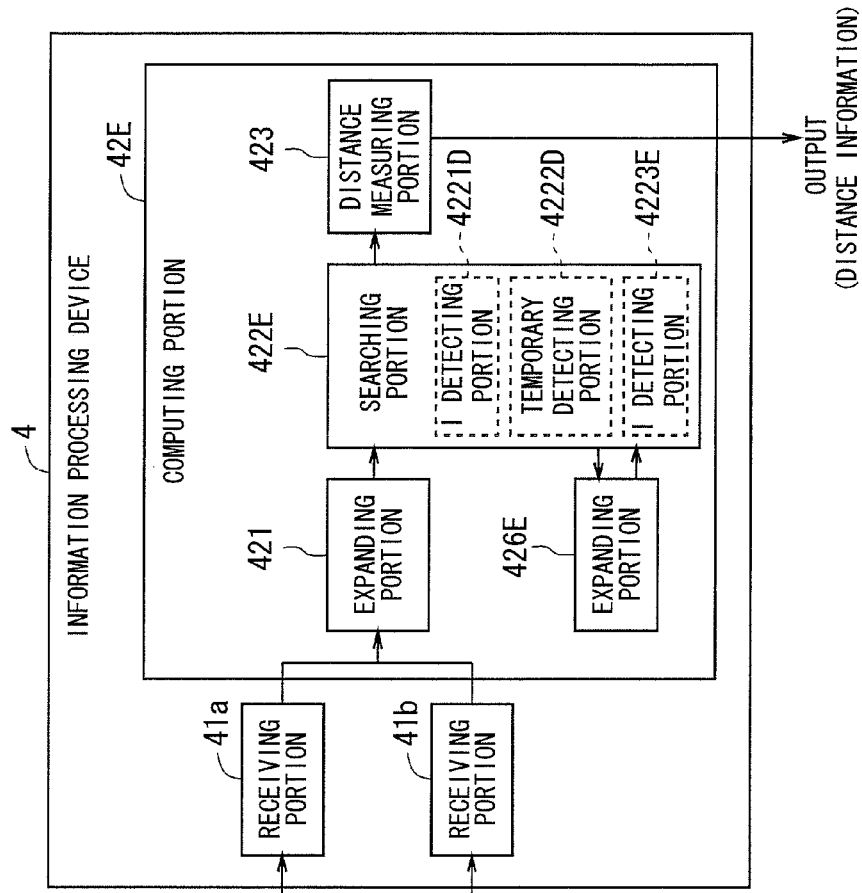
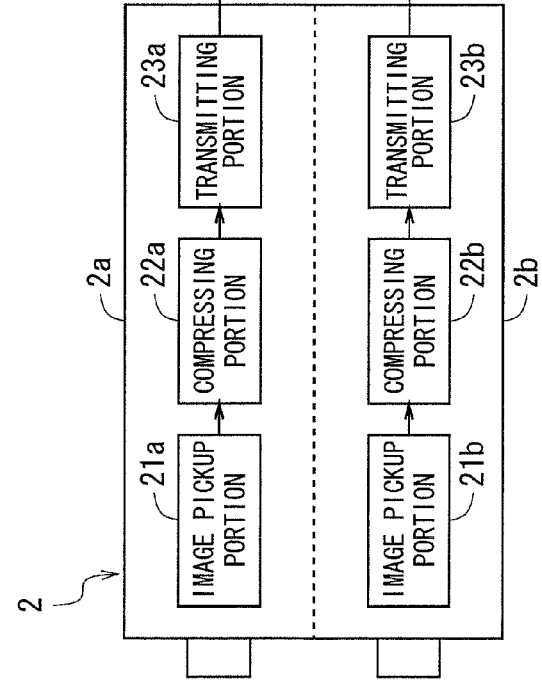
FIG. 41

F I G. 4 2
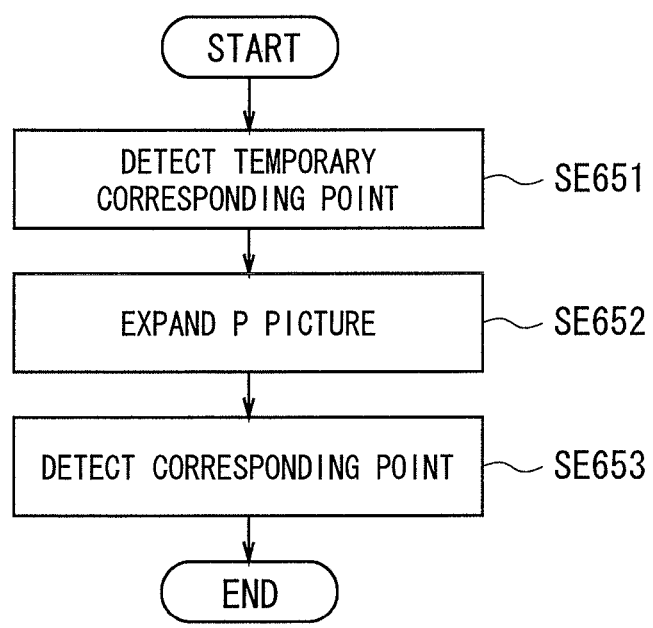

IMAGE PROCESSING SYSTEM, IMAGE PROCESSING METHOD, AND PROGRAM

TECHNICAL FIELD

The present invention relates to an image processing technique which is concerned with a detection of a corresponding point.

BACKGROUND ART

Conventionally, there is known a processing (referred to as a corresponding point detection processing) for setting, as a target, a stereo image obtained by photographing the same subject from different viewpoints by means of a stereo camera, thereby detecting a pixel capturing the same portion of the subject. There is also known a technique for setting, as a target, each stereo image capturing a sequential change in a subject, thereby detecting a corresponding point (for example, Japanese Patent Application Laid-Open No. 2004-301607 or the like).

SUMMARY OF INVENTION

Problems to be Solved by the Invention

Referring to a stereo image having a moving picture-like manner, a data volume is large. In consideration of a data transmission, storage or the like, it is preferable that a moving picture compression should be carried out by a method of MPEG (Moving Picture Experts Group) or the like. In the case in which the moving picture compression is carried out, there is proposed a manner for restoring a stereo image having the moving picture-like manner by an expansion processing to detect a corresponding point. However, there is a drawback that a time taken for detecting a corresponding point is prolonged due to an increase in a computation required for the expansion processing.

The present invention has been made in consideration of the problems and has an object to provide a technique for reducing a computation related to a detection of a corresponding point setting a compressed dynamic image as a target.

Means for Solving the Problem

In order to attain the object, an image processing system according to a first aspect includes an acquiring portion for acquiring first and second compressed dynamic images including a reference frame and a prediction frame having each pixel indicated by motion information based on the other frame respectively, and a computing portion for carrying out a detection processing for detecting a corresponding point which corresponds to each reference point of one frame contained in the first compressed dynamic image from one frame contained in the second compressed dynamic image by causing each set of frames between the first compressed dynamic image and the second compressed dynamic image to be a target. In the image processing system, the computing portion executes the detection processing intended for a set of the prediction frames by using motion information indicative of the set of prediction frames.

An image processing system according to a second aspect is directed to the image processing system according to the first aspect, wherein the computing portion executes the detection processing intended for the set of prediction frames based on a result of a detection obtained by the detection processing intended for a set of the reference frames and the motion information indicative of the set of prediction frames.

An image processing system according to a third aspect is directed to the image processing system according to the second aspect, further including a calculating portion for calculating an evaluation value related to a similarity to one reference point contained in one prediction frame of the set of prediction frames in relation to one corresponding point detected from the other prediction frame with respect to the one reference point in the detection processing related to the set of prediction frames, and a deciding portion for deciding a reliability related to the one corresponding point by a comparison of the evaluation value and a preset threshold.

An image processing system according to a fourth aspect is directed to the image processing system according to the first aspect, wherein the computing portion comprises a first detecting portion for calculating one temporary corresponding point which corresponds to one reference point contained in one prediction frame of the set of prediction frames from the other prediction frame based on a result of a detection obtained by the detection processing intended for a set of the reference frames and motion information indicative of the set of prediction frames in relation to the set of prediction frames, and a second detecting portion for detecting one corresponding point corresponding to the one reference point from the other prediction frame by a comparison of a region including the one reference point in the one prediction frame and a region including the one temporary corresponding point in the other prediction frame.

An image processing system according to a fifth aspect is directed to the image processing system according to the first aspect, wherein the computing portion includes a first detecting portion for calculating one temporary corresponding point which corresponds to one reference point contained in one prediction frame of the set of prediction frames from the other prediction frame based on a result of a detection obtained by the detection processing intended for a set of the reference frames and motion information indicative of the set of prediction frames in relation to the set of prediction frames, an expanding portion for expanding the one prediction frame to generate one expanded frame and expanding the other prediction frame to generate the other expanded frame, and a second detecting portion for detecting one corresponding point which corresponds to the one reference point from the other expanded frame based on a region including the one temporary corresponding point in the other expanded frame.

An image processing system according to a sixth aspect is directed to the image processing system according to the first aspect, wherein the each reference frame is a frame subjected to a compression processing for deleting information about a frequency in a predetermined band, and the computing portion executes a calculation using a phase only correlation method while carrying out weighting for reducing a frequency component for the predetermined band more greatly than a residual band, thereby carrying out the detection processing intended for a set of frames.

An image processing system according to a seventh aspect is directed to the image processing system according to the first aspect, wherein the each reference frame is a frame subjected to a compression processing in a block unit having a predetermined size, and the computing portion sets a first region including one reference point to a first frame of the first compressed dynamic image to fit the block, sets a second region to a second frame of the second compressed dynamic image to fit the block and carries out a calculation using a phase only correlation method intended for the first region and the second region, thereby executing the detection processing intended for a set of the first frame and the second frame.

An image processing system according to an eighth aspect is directed to the image processing system according to the first aspect, wherein the computing portion converts a frame to conform to a format of one of the reference frame and the prediction frame and executes the detection processing with respect to the set of the reference frame and the prediction frame.

An image processing system according to a ninth aspect is directed to the image processing system according to the eighth aspect, wherein the computing portion expands the prediction frame and executes the detection processing intended for the reference frame and the prediction frame subjected to the expansion with respect to the set of the reference frame and the prediction frame.

An image processing system according to a tenth aspect is directed to the image processing system according to the first aspect, wherein the set of prediction frames include a first prediction frame and a second prediction frame, and the computing portion detects one corresponding point which corresponds to one reference point from the second prediction frame by a comparison of the motion information related to a reference region including the one reference point in the first prediction frame and the motion information related to a comparison region including one temporary corresponding point in the second prediction frame.

An image processing system according to an eleventh aspect is directed to the image processing system according to the tenth aspect, wherein the motion information about the reference region includes one two-dimensional reference distribution of motion information about one direction and the other two-dimensional reference distribution of motion information about the other direction which is different from the one direction, the motion information about the comparison region includes one two-dimensional comparison distribution of motion information about the one direction and the other two-dimensional comparison distribution of motion information about the other direction, and the computing portion detects the one corresponding point which corresponds to the one reference point from the second prediction frame by a comparison of voxel information including the one two-dimensional reference distribution and the other two-dimensional reference distribution and voxel information including the one two-dimensional comparison distribution and the other two-dimensional comparison distribution.

An image processing system according to a twelfth aspect is directed to the image processing system according to the first aspect, further including a first image pickup portion for obtaining a first dynamic image by a first serial image pickup intended for a subject, a second image pickup portion for obtaining a second dynamic image by a second serial image pickup intended for the subject in an identical timing to the first serial image pickup, a first compressing portion for executing a compression processing over the first dynamic image, thereby generating the first compressed dynamic image, and a second compressing portion for executing a compression processing over the second dynamic image, thereby generating the second compressed dynamic image.

An image processing system according to a thirteenth aspect is directed to the image processing system according to the first aspect, further including a first compressing portion for executing a compression processing over a first dynamic image, thereby generating the first compressed dynamic image, and a second compressing portion for executing a compression processing over a second dynamic image, thereby generating the second compressed dynamic image, the first and second compressing portions being operated in such a manner that each set of frames between a first dynamic image and a second dynamic image makes either a set of the reference frames or a set of the prediction frames.

An image processing method according to a fourteenth aspect includes the steps of (a) acquiring first and second compressed dynamic images including a reference frame and a prediction frame having each pixel indicated by motion information based on the other frame, respectively, and (b) executing a detection processing for detecting a corresponding point which corresponds to each reference point of one frame contained in the first compressed dynamic image from one frame contained in the second compressed dynamic image by causing each set of frames between the first compressed dynamic image and the second compressed dynamic image to be a target. In the image processing method, the detection processing intended for a set of the prediction frames is executed by using motion information indicative the set of prediction frames at the step (b).

A non-transitory computer readable recording medium storing a computer-readable program according to a fifteenth aspect, the program controlling an information processing system to operate as an image processing system, and the image processing system includes an acquiring portion for acquiring first and second compressed dynamic images including a reference frame and a prediction frame having each pixel indicated by motion information based on the other frame respectively, and a computing portion for carrying out a detection processing for detecting a corresponding point which corresponds to each reference point of one frame contained in the first compressed dynamic image from one frame contained in the second compressed dynamic image by causing each set of frames between the first compressed dynamic image and the second compressed dynamic image to be a target. In the image processing system, the computing portion executes the detection processing intended for a set of the prediction frames by using motion information indicative of the set of prediction frames.

Effect of the Invention

By the image processing system relating to any of the first to thirteenth aspects as well, it is possible to reduce the computation related to the detection of the corresponding point setting the compressed dynamic image as a target.

According to the image processing system relating to the second aspect, particularly, it is possible to reduce the computation required for the detection of the corresponding point related to the prediction frame.

According to the image processing system relating to the third aspect, moreover, it is possible to take various countermeasures against the corresponding point having a low reliability.

According to the image processing system relating to any of the fourth and fifth aspects as well, furthermore, it is possible to easily detect the corresponding point by using the temporary corresponding point. Therefore, it is possible to reduce the computation related to the detection of the corresponding point while maintaining the precision in the detection of the corresponding point.

According to the image processing system relating to the sixth aspect, moreover, it is possible to reduce the computation related to the detection of the corresponding point by a decrease in unnecessary calculations.

According to the image processing system relating to the seventh aspect, furthermore, it is possible to suppress a reduction in precision related to the detection of the corresponding point.

According to the image processing system relating to the eighth aspect, moreover, it is also possible to detect the corresponding point for a set of frames having different configurations.

According to the image processing system relating to the ninth aspect, furthermore, it is possible to detect the corresponding point for the set of frames having the different configurations while suppressing an increase in the computation.

According to the image processing system relating to the thirteenth aspect, moreover, the calculation for matching the configurations of the frames is reduced. Therefore, it is possible to decrease the computation related to the detection of the corresponding point.

According to any of the image processing method relating to the fourteenth aspect and the non-transitory computer readable recording medium storing a computer-readable program relating to the fifteenth aspect as well, moreover, it is possible to reduce the computation related to the detection of the corresponding point setting the compressed dynamic image as the target.

BRIEF DESCRIPTION OF DRAWINGS

FIG. 2 is a diagram showing a functional configuration of an information processing system according to first and second embodiments.

FIG. 5 is a schematic diagram illustrating a configuration of each frame.

FIG. 6 is a schematic diagram illustrating a configuration of each first reduced frame.

FIG. 15 is a schematic diagram showing an example in which the window is set to each frame.

FIG. 22 is a flow chart showing an operation flow of an information processing system.

FIG. 23 is a flow chart showing the operation flow of the information processing system.

FIG. 27 is a flow chart showing an operation flow of the information processing system.

FIG. 31 is a diagram showing a functional configuration of an information processing system according to a fourth embodiment.

FIG. 32 is a diagram for explaining a method of deciding a reliability according to the fourth embodiment.

FIG. 41 is a diagram showing a functional configuration of an information processing system according to a third variant.

FIG. 42 is a flow chart showing an operation flow of the information processing system.

EMBODIMENT FOR CARRYING OUT THE INVENTION

Figure 1:
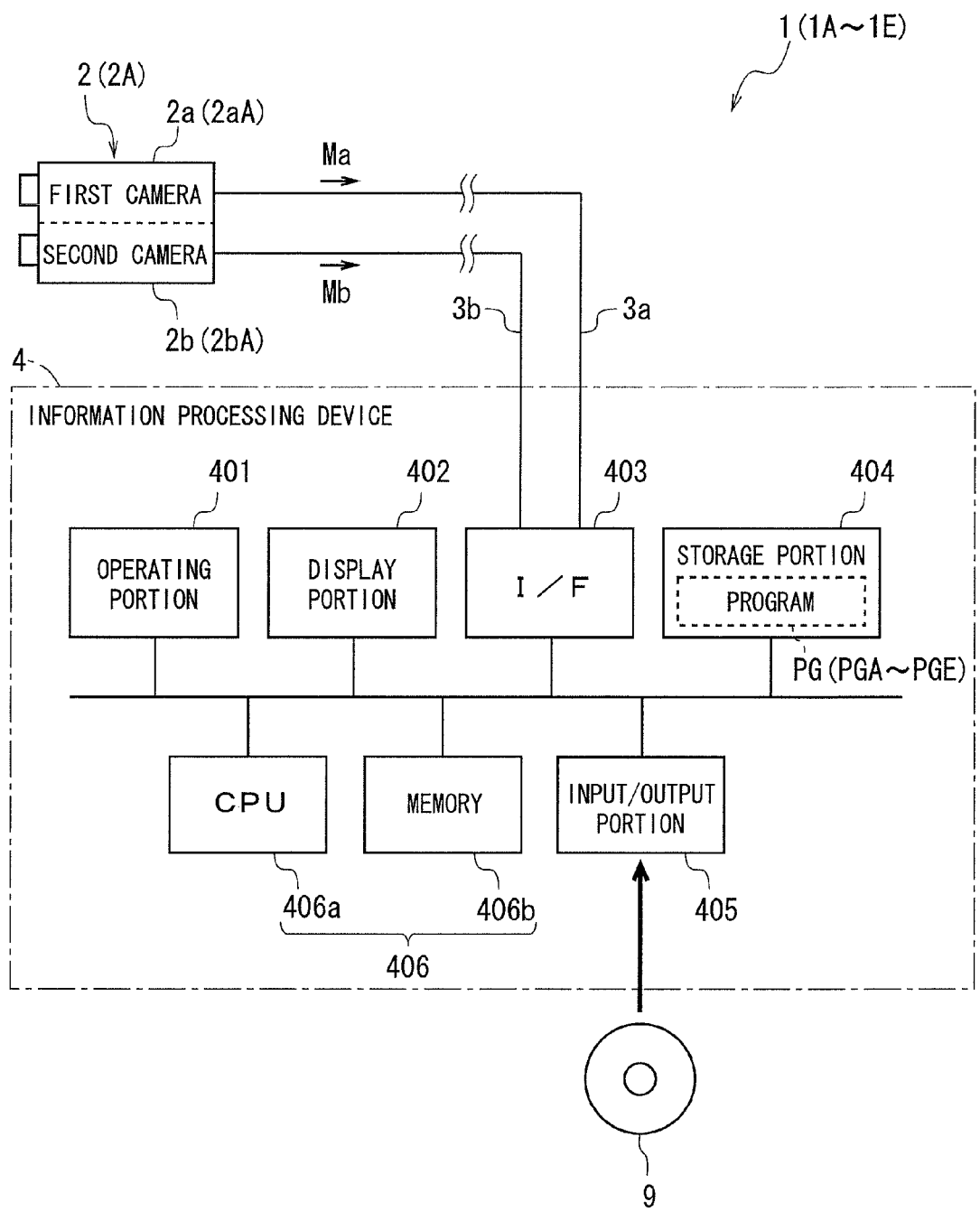
FIG. 1 is a diagram schematically showing an information processing system according to each embodiment and a third variant.

Each embodiment will be described below based on the drawings, respectively. In the drawings, portions having the same structures and functions have the same reference numerals and repetitive description will be omitted.

<(1) First Embodiment>

<(1-1) Summary of Image Processing System>

FIG. 1 is a diagram showing a schematic structure of an information processing system 1 according to a first embodiment of the present invention.

The information processing system 1 includes a stereo camera 2, communication lines 3a and 3b, and an information processing device 4. The stereo camera 2 and the information processing device 4 are connected to enable the transmission/receipt of various signals through the communication lines 3a and 3b.

The stereo camera 2 includes first and second cameras 2a and 2b. The respective cameras 2a and 2b include a structure of a digital camera including an image pickup element such as a CCD, for example, and carry out such image pickup as to acquire a distribution of luminance information related to a subject as image data (which will also be referred to as an image) related to the subject through a photoelectric conversion while receiving a light transmitted from the subject. Moreover, each of the cameras 2a and 2b carries out image pickup (serial image pickup) at a predetermined number of times (for example, 60 times) every predetermined time (for example, one second), thereby acquiring dynamic image data (which will also be referred to as a dynamic image) capturing a sequential change in a subject.

Moreover, the first and second cameras 2a and 2b are disposed apart from each other in a predetermined direction, and sequentially carry out a processing for picking up an image of the same subject in the same timing at the same period from different viewpoints. Images of each set picked up in the same timing by the first and second cameras 2a and 2b are so-called stereo images.

Moreover, the first camera 2a carries out a moving picture compression over a dynamic image obtained by image pickup (which will also be referred to as a first dynamic image) to generate a compressed dynamic image (which will also be referred to as a first compressed dynamic image) Ma, and transmits the first compressed dynamic image Ma to the information processing device 4 through the communication line 3a. The second camera 2b carries out the moving picture compression over a dynamic image obtained by image pickup (which will also be referred to as a second dynamic image) to generate a compressed dynamic image (which will also be referred to as a second compressed dynamic image) Mb, and transmits the second compressed dynamic image Mb to the information processing device 4 through the communication line 3b. It is possible to employ a moving picture compression in accordance with various standards such as so-called MPEG4 or the like, and it is assumed that a moving picture compression in accordance with the MPEG4 is employed in the following description.

Moreover, each of the first and second compressed images Ma and Mb include N (N is a natural number of two or more) images (which will also be referred to as frames). Data indicative of each frame and the frame itself will generally be referred to as a frame. For simplicity of explanation, moreover, description will be given on the assumption that the first and second cameras 2a and 2b are set so as to cause coordinates of a pixel capturing the same subject portion to be identical in a Y direction and to be different from each other in an X direction for a set of frames obtained in the same timing by means of the first and second cameras 2a and 2b.

The communication lines 3a and 3b may be wire circuits using a cable which can transmit/receive various signals, or the like, and may be a radio circuit using a radio communication or the like.

The information processing device 4 is constituted by a personal computer, for example, and includes an operating portion 401, a display portion 402, an interface (I/F) portion 403, a storage portion 404, an input/output portion 405 and a control portion 406.

The operating portion 401 includes a mouse, a keyboard and the like, for example. The display portion 402 includes a liquid crystal display or the like, for example. The I/F portion 403 receives a signal from the stereo camera 2 and transmits a signal to the stereo camera 2. The storage unit 404 includes a hard disk or the like, for example, and stores various data, a program PG and the like. The input/output portion 405 includes a disk drive capable of attaching a storage medium 9 such as an optical disk, reads information from the storage medium 9 and outputs the information to the control portion 406, and writes the data output from the control unit 406 to the storage medium 9.

The control portion 406 includes a CPU 406a serving as a processor and a memory 406b for temporarily storing data, and chiefly controls each portion of the information processing device 4. The program PG in the storage portion 404 is read and executed in the control unit 406 so that various functions, various information processings and the like are implemented. By the control of the control portion 406 depending on the program PG, herein, the information processing device 4 functions as an image processing device and the information processing system 1 functions as an image processing system.

<(1-2) Functional Configuration of Image Processing System>

FIG. 2 is a diagram showing a functional configuration of the information processing system 1.

<(1-2-1) Functional Configuration of Stereo Camera>

The first camera 2a includes an image pickup portion 21a, a compressing portion 22a and a transmitting portion 23a, and the second camera 2b includes an image pickup portion 21b, a compressing portion 22b and a transmitting portion 23b. Herein, the image pickup portion 21a and the image pickup portion 21b include the same structure, the compressing portion 22a and the compressing portion 22b include the same structure, and the transmitting portion 23a and the transiting portion 23b include the same structure. In order to avoid the repetition of the explanation, therefore, the image pickup portion 21a, the compressing portion 22a and the transmitting portion 23a will mainly be described.

The image pickup portion 21a includes an image pickup element and a signal processing portion. The image pickup element includes a CCD or the like, for example, and the signal processing portion includes a CDS circuit, an AGC circuit and an A/D converting circuit, for example. An analog signal output from the image pickup element is sequentially subjected to a noise reduction processing through the CDS circuit, a level adjustment processing through the AGC circuit, and a conversion into a digital signal through the A/D converting circuit.

By these functions, the image pickup portion 21a obtains a first dynamic image including a plurality of frames indicated by a digital signal through a serial image pickup (which will also be referred to as a first serial image pickup). Moreover, the image pickup portion 21b picks up an image synchronously with the image pickup portion 21a. More specifically, the image pickup portion 21b obtains a second dynamic image including a plurality of frames indicated by a digital signal through a serial image pickup (which will also be referred to as a second serial image pickup) intended for the same subject as that in the first serial image pickup in the same timing as that in the first serial image pickup. It is preferable that the image pickup timings in the image pickup portions 21a and 21b should be controlled in response to a signal sent from the control portion 406, for example.

The compressing portion 22a carries out a moving picture compression over the first dynamic image, thereby generating the first compressed dynamic image Ma. More specifically, the compressing portion 22a carries out the moving picture compression in accordance with the MPEG4 including various processings such as a discrete cosine transformation (DCT) and a quantization. In the DCT or the quantization, a data compression processing is carried out while an image region having a predetermined size (which will also be referred to as a block) is set to be a single processing unit, and information about a frequency in a predetermined band (mainly, a high frequency band) is deleted. It is sufficient that each block having a predetermined size is a square image region having a side constituted by a predetermined number of (8 or 16) pixels, or the like. The compressing portion 22b carries out the moving picture compression over the second dynamic image, thereby generating the second compressed dynamic image Mb in the same manner as the compression processing 22a.

In the moving picture compression, at least one of the frames included in the dynamic image is set to be a reference frame (which will also be referred to as the reference frame or an I picture) and frames other than the reference frame are frames of a prediction (which will also be referred to as prediction frames) indicated by each pixel through motion information based on the reference frame. The motion information related to each pixel is information indicative of a change in coordinates of a pixel capturing each portion of a subject between an i−1)th frame (i is a natural number which is equal to or smaller than N) and an i-th frame which constitute a dynamic image. In other words, the reference frame includes a pixel value (a luminance value or the like) every pixel and the prediction frame includes motion information corresponding to each pixel.

In the present embodiment, it is sufficient that a position of a pixel constituting each frame is indicated as coordinates related to two axes of X and Y which are orthogonal to each other (a value of an X coordinate and a value of a Y coordinate) and a change in coordinates corresponding to the motion information is expressed in a format of a motion vector indicated as the value of the X coordinate and the value of the Y coordinate. In other words, the motion information includes motion information about an X direction and motion information about a Y direction.

If the i-th frame is the prediction frame, the prediction frame may be a frame (which will also be referred to as a P picture) in which each pixel is indicated by motion information obtained by a comparison of the i-th frame and the (i−1)th frame or may be a frame (which will also be referred to as a B picture) in which each pixel is indicated by motion information obtained by a comparison of the i-th frame and the (i−1)th and (i+1)th frames. Description will be given by taking, as an example, the case in which the prediction frame is the P picture.

Figure 3:
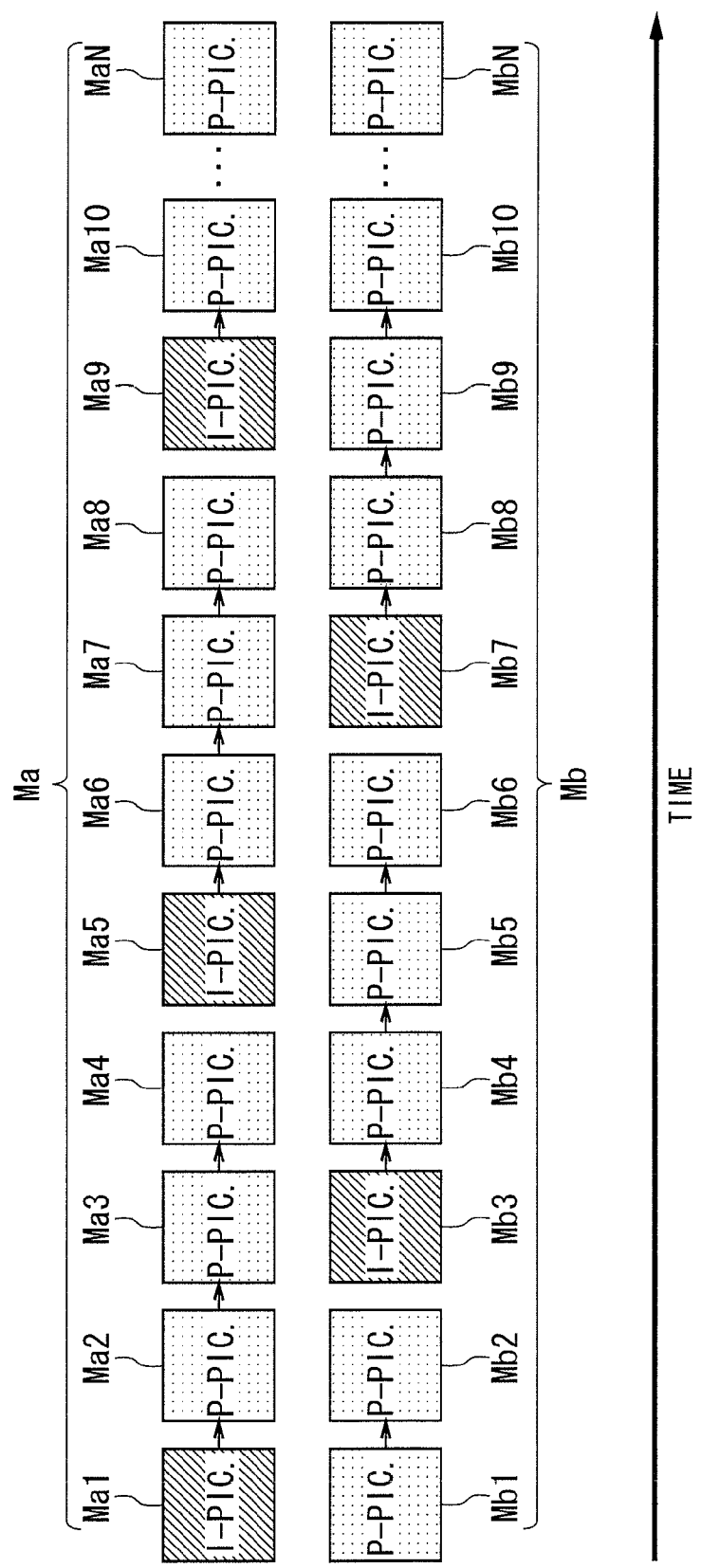
FIG. 3 is a diagram illustrating an aspect of first and second compressed dynamic images.

FIG. 3 is a diagram illustrating an aspect of the first and second compressed dynamic images Ma and Mb. In FIG. 3, the i-th frame constituting the first compressed dynamic image Ma is described as a frame Mai related to an image pickup at a time Ti and the i-th frame constituting the second compressed dynamic image Mb is described as a frame Mbi related to the image pickup at the time Ti.

As shown in FIG. 3, the first compressed dynamic image Ma includes N frames Ma1 to MaN. First, fifth and ninth frames Ma1, Ma5 and Ma9 constitute the I picture and second to fourth, sixth to eighth, tenth and N-th frames Ma2 to Ma4, Ma6 to Ma8, Ma10 and MaN constitute the P picture. Moreover, the second compressed dynamic image Mb includes N frames Mb1 to MbN. Third and seventh frames Mb3 and Mb7 constitute the I picture and first, second, fourth to sixth, eighth to tenth and N-th frames Mb1, Mb2, Mb4 to Mb6, Mb8 to Mb10, and MaN constitute the P picture.

As shown in an arrow of FIG. 3, herein, the P picture provided immediately after the I picture includes each pixel indicated by motion information based on the I picture provided immediately therebefore. Moreover, the P picture provided immediately after the P picture includes each pixel indicated by motion information based on the P picture provided immediately therebefore. Consequently, each pixel is indirectly indicated by the motion information based on the I picture. In all of the P pictures, each pixel may be directly indicated by the motion information based on the I picture.

The transmitting portion 23a transmits the first compressed dynamic image Ma to the information processing device 4. Moreover, the transmitting portion 23b transmits the second compressed dynamic image Mb to the information processing device 4.

<(1-2-2) Functional Configuration of Image processing device>

As shown in FIG. 2, the information processing device 4 to be an image processing device includes receiving portions 41a and 41b and a computing portion 42.

The receiving portions 41a and 41b are implemented by the I/F portion 403 to be an acquiring portion. The receiving portion 41a receives the first compressed dynamic image Ma output from the first camera 2a, thereby acquiring the first compressed dynamic image Ma. The receiving portion 41b receives the second compressed dynamic image Mb output from the second camera 2b, thereby acquiring the second compressed dynamic image Mb.

The computing portion 42 is implemented by an execution of a program PG through the control portion 406, and includes an expanding portion 421, a searching portion 422 and a distance measuring portion 423 as functional structures.

The expanding portion 421 expands a P picture included in the first and second compressed dynamic images Ma and Mb if necessary, thereby generating the P picture subjected to the expansion (which will also be referred to as a D picture) having information about a pixel value for each pixel in the same manner as the I picture and outputting the P picture to the searching portion 422. The D picture having the same configuration as the I picture corresponds to the reference frame. Moreover, the expanding portion 421 exactly outputs, to the searching portion 422, the I picture and the P picture which does not need to be expanded.

Figure 4:
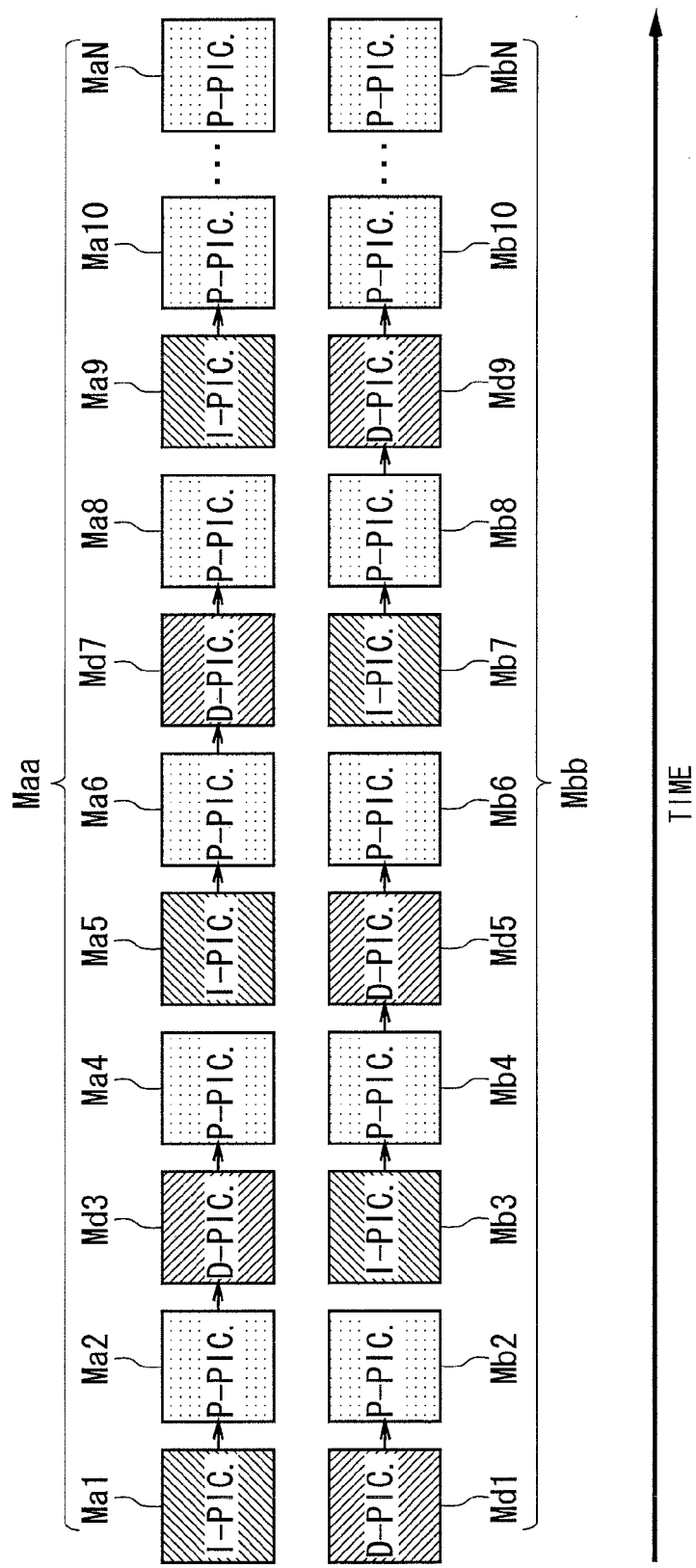
FIG. 4 is a diagram for explaining a principle of a processing for detecting a corresponding point according to the first embodiment.

More specifically, as shown in FIG. 3, a first set of frames Ma1 and Mb1, a third set of frames Ma3 and Mb3, a fifth set of frames Ma5 and Mb5, a seventh set of frames Ma7 and Mb7, and a ninth set of frames Ma9 and Mb9 are sets of the I picture and the P picture, respectively. Referring to the frames in the respective sets, as shown in FIG. 4, the P pictures Mb1, Ma3, Mb5, Ma7 and Mb 9 are expanded by the expanding portion 421 so that D pictures Md1, Md3, Md5, Md7 and Md9 are generated to make the sets of I and D pictures. The first and second compressed dynamic images Ma and Mb may include the frames to make the sets of I pictures.

As described above, a part of the P pictures are converted into the D pictures by the expanding portion 421. Therefore, the first and second compressed dynamic images Ma and Mb are changed into first and second compressed dynamic images Maa and Mbb. Each frame included in the first compressed dynamic image Maa will also be referred to as "one frame" and each frame included in the second compressed dynamic image Mbb will also be referred to as "the other frame".

The searching portion 422 detects a corresponding relationship between the pixels capturing the same portion of the subject by setting, as a target, the frames of each set related to an image pickup at the same time between the first compressed dynamic image Maa and the second compressed dynamic image Mbb. In the searching portion 422, a point to be a reference of a detection for one the frame included in the first compressed dynamic image Maa (which will also be referred to as a reference point) is sequentially set, and a processing for detecting a point corresponding to the reference point (which will also be referred to as a corresponding point) from the other frame included in the second compressed dynamic image Mbb (which will also be referred to as a detection processing) is carried out every reference point.

The detection processing includes a detection processing intended for the set of I pictures and the set of I and D pictures (which will also be referred to as an I detection processing) and a detection processing intended for the set of P pictures (which will also be referred to as a P detection processing). In other words, if the target of the processing for detecting the corresponding point is the set of I and P pictures, the P picture is expanded by the expanding portion 421 so as to be the D picture, and furthermore, the I detection processing intended for the I picture and the D picture is carried out in the computing portion 42. If the target of the processing for detecting the corresponding point is the set of P pictures, moreover, the expansion of the P picture or the like is not carried out but the P detection processing is carried out.

In the present embodiment, in any of the I detection processing and the P detection processing, there is generated sets of frames having a resolution reduced into a predetermined number of (for example, three) stages by setting the frames of each set as a base, and a relationship between the reference point capturing the same portion of the subject and the corresponding point is detected in order from the set of frames having the lower resolutions. At this time, a result of the detection intended for the set of frames having a relatively lower resolution by one stage is utilized for a detection of a next stage which is intended for the set of frames having a relatively higher resolution by one stage.

Description will be given, in order, to [A] the generation of sets of frames related to resolutions in a plurality of stages, [B] setting of a reference point and [C] the detection of a corresponding point which corresponds to each reference point in the detection processing intended for a set of frames.

[A] Generation of Sets of Frames Related to Resolution in Plural Stages

FIG. 5 is a schematic diagram illustrating a configuration of each frame included in the first and second compressed dynamic images Maa and Mbb. In each of the frames, a large number of pixels are arranged in a matrix. More specifically, a first predetermined number of (herein, 480) pixels are arranged in a vertical direction (a Y direction) and a second predetermined number of (herein, 640) pixels are arranged in a transverse direction (an X direction). In each of the frames, an upper left position is set to be an original point, a position in the transverse direction of each pixel constituting each frame is represented by an X coordinate, and a position in the vertical direction is represented by a Y coordinate. In other words, in each of the frames, a position of each pixel is represented by the coordinates (X, Y) and, for example, a value of the X coordinate is increased by one when a shift of one pixel in a rightward direction (the X direction) is made, and a value of the Y coordinate is increased by one when a shift of one pixel in a downward direction (the Y direction) is made.

FIG. 6 is a diagram illustrating a configuration of a frame generated by a reduction in a resolution of each frame by one stage (which will also be referred to as a first reduced frame). The reduction in the resolution by one stage is implemented by thinning a vertical line every other column and a horizontal line every other row in a plurality of pixel columns in the vertical direction (which will also be referred to as vertical lines) and a plurality of pixel rows in the transverse direction (which will also be referred to as horizontal lines) which constitute each frame respectively, for example. Herein, the first reduced frame includes a structure in which 240 pixels in the vertical direction and 320 pixels in the transverse direction are arranged in a matrix.

For example, a first reduced frame (which will also be referred to as one first reduced frame) $Ma1_{S1}$ is generated from the one frame Ma1, and a first reduced frame (which will also be referred to as the other first reduced frame) $Md1_{S1}$ is generated from the other frame Md1. Moreover, one first reduced frames $Ma2_{S1}$ is generated from one frame Ma2, and the other first reduced frame $Mb2_{S1}$ is generated from the other frame Mb2.

Figure 7:
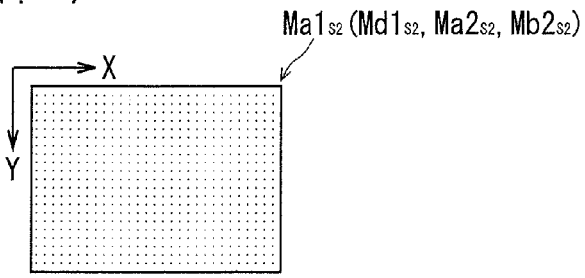
FIG. 7 is a schematic diagram illustrating a configuration of each secondary reduced frame.

FIG. 7 is a diagram illustrating a configuration of a frame generated by a reduction in a resolution of each frame by two stages (which will also be referred to as a secondary reduced frame). The reduction in the resolution by two stages is implemented by thinning a vertical line every other column and a horizontal line every other row in a plurality of vertical lines and a plurality of horizontal lines which constitute each first reduced frame, for example. Herein, the secondary reduced frame includes a structure in which 120 pixels in the vertical direction and 160 pixels in the transverse direction are arranged in a matrix.

For example, a secondary reduced frame (which will also be referred to as one secondary reduced frame) $Ma1_{S2}$ is generated from the one frame Ma1, and a secondary reduced frame (which will also be referred to as the other secondary reduced frame) $Md1_{S2}$ is generated from the other frame Md1. Moreover, one secondary reduced frame $Ma2_{S2}$ is generated from the one frame Ma2, and the other secondary reduced frame $Mb2_{S2}$ is generated from the other frame Mb2.

Figure 8:
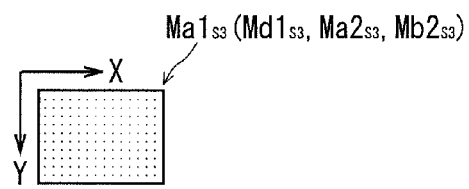
FIG. 8 is a schematic diagram illustrating a configuration of each tertiary reduced frame.

FIG. 8 is a diagram illustrating a configuration of a frame generated by a reduction in a resolution of each frame by three stages (which will also be referred to as a tertiary reduced frame). The reduction in the resolution by three stages is implemented by thinning a vertical line every other column and a horizontal line every other row in a plurality of vertical lines and a plurality of horizontal lines which constitute each secondary reduced frame, for example. Herein, the tertiary reduced frame includes a structure in which 60 pixels in the vertical direction and 80 pixels in the transverse direction are arranged in a matrix.

For example, a tertiary reduced frame (which will also be referred to as one tertiary reduced frame) $Ma1_{S3}$ is generated from the one frame Ma1, and a tertiary reduced frame (which will also be referred to as the other tertiary reduced frame) $Md1_{S3}$ is generated from the other frame Md1. Moreover, one tertiary reduced frame $Ma2_{S3}$ is generated from the one frame Ma2, and the other tertiary reduced frame $Mb2_{S3}$ is generated from the other frame Mb2.

Figure 9:
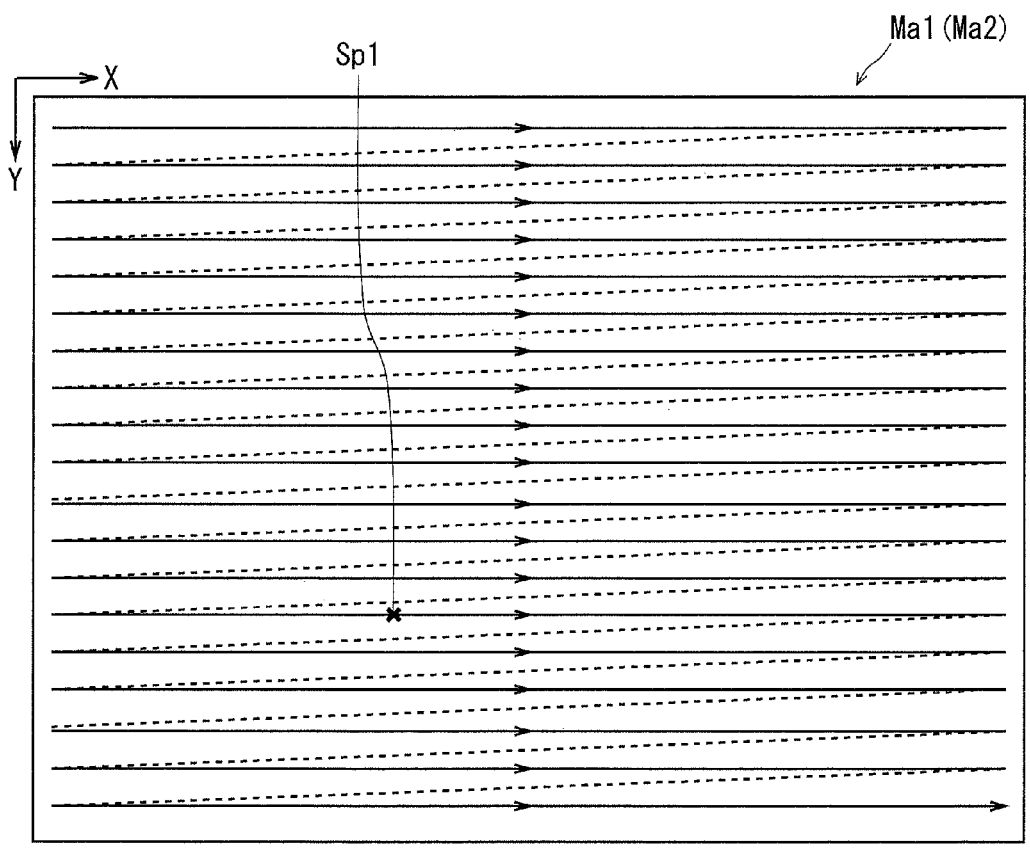
FIG. 9 is a schematic diagram illustrating a setting manner of a reference point with respect to each frame.

[B] Setting of Reference Point:

As shown in FIG. 9, a point to be a reference of the detection of the corresponding point (which will also be referred to as a reference point) Sp1 is set to the one frame. Herein, a pixel on an upper left end of the one frame is set to be a starting point, and as shown in an arrow of FIG. 9, there is repeated an operation for setting the reference point Sp1 in order with a shift of one pixel from a left end toward a right end along a single horizontal line with respect to one frame, and setting the reference point Sp1 in order with a shift of one pixel from the left end toward the right end along a horizontal line on a just lower side (a+Y side) when the reference point Sp1 along a single horizontal line is completely set. Herein, every time a corresponding point which corresponds to the single reference point Sp1 is detected over the other frame, a next reference point Sp1 is set.

[C] Detection of Corresponding Point Corresponding to Each Reference Point

In the detection of the corresponding point which corresponds to each reference point Sp1, the following steps (C1) to (C12) are carried out.

Figure 10:
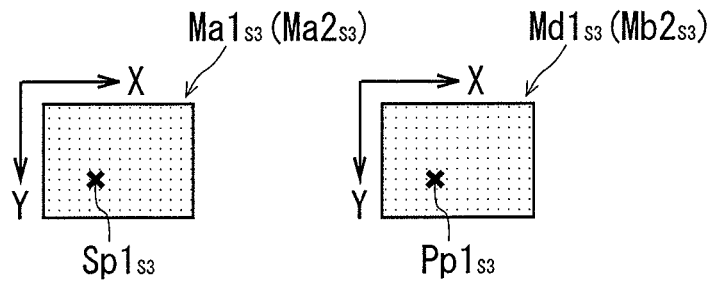
FIG. 10 is a diagram showing an example in which the reference point and a processing target point are set in the tertiary reduced frame.

(C1) An initial parallax to be a reference of a detection of a corresponding point intended for a set of tertiary reduced frames is temporarily set. The initial parallax is set to be zero or the like, for example. In detail, as shown in FIG. 10, a point (a reference point) $Sp1_{S3}$ corresponding to the reference point Sp1 is set to the tertiary reduced frame (for example, the frames $Ma1_{S3}$ and $Ma2_{S3}$). Moreover, a point (a processing target point) $Pp1_{S3}$ to be a target of a calculation processing is set to the other tertiary reduced frame (for example, frames $Md1_{S3}$ and $Mb2_{S3}$). A predetermined initial parallax indicates a shift quantity of the X coordinate between the position of the reference point $Sp1_{S3}$ in the one tertiary reduced frame and the position of the processing target point $Pp1_{S3}$ in the other tertiary reduced frame.

Figure 11:
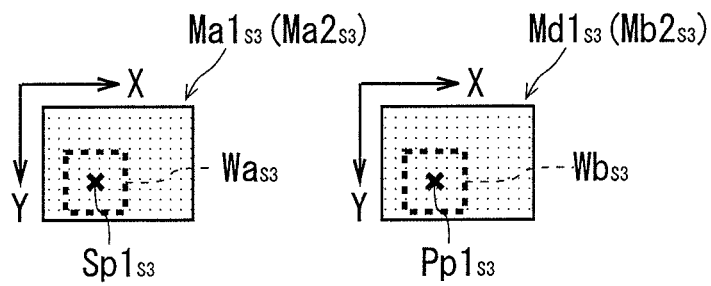
FIG. 11 is a schematic diagram showing an example in which a window is set to the tertiary reduced frame.

(C2) As shown in FIG. 11, a window (which will also be referred to as a reference region) $Wa_{S3}$ included around the reference point $Sp1_{S3}$ is set into the one tertiary reduced frames (for example, the one tertiary reduced frame $Ma1_{S3}$ or $Ma2_{S3}$). Moreover, a window (which will also be referred to as a comparison region) $Wb_{S3}$ included around the processing target point $Pp1_{S3}$ is set into the other tertiary reduced frame (for example, the other tertiary reduced frames $Md1_{S3}$ and $Mb2_{S3}$). The reference region $Wa_{S3}$ and the comparison region $Wb_{S3}$ are regions taking the same size and shape (herein, a square), and are constituted by arranging 17 pixels in the vertical direction and the transverse direction respectively, for example.

(C3) By using a phase only correlation method (a POC method) which will be described below, a correlation between the reference region $Wa_{S3}$ and the comparison region $Wb_{S3}$ is calculated so that the corresponding point is detected on the other tertiary reduced frame.

Figure 12:
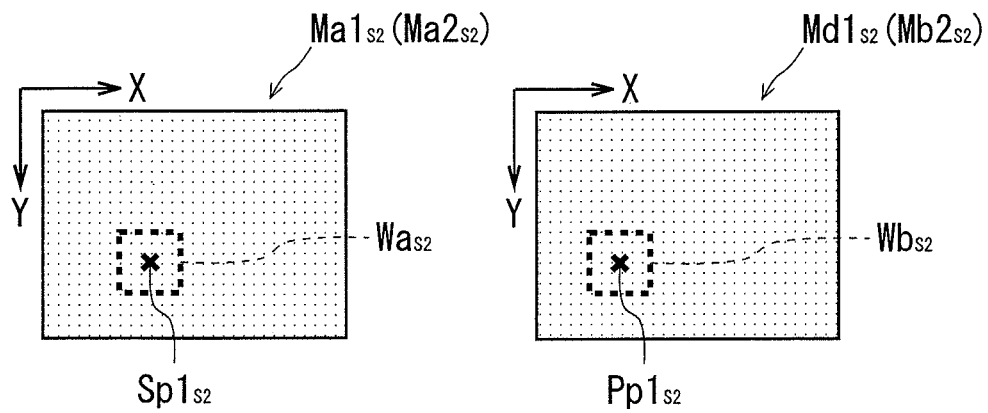
FIG. 12 is a schematic diagram showing an example in which the window is set to the secondary reduced frame.

(C4) There is temporarily set a parallax (a reference parallax) to be a reference in the detection of the corresponding point intended for a set of secondary reduced frames. The reference parallax is set based on a result of the detection at the step (C3). In detail, the reference parallax corresponds to a shift quantity of the X coordinate between a position of the reference point $Sp1_{S3}$ in the one tertiary reduced frames and a position of the corresponding point in the other tertiary reduced frame detected at the step (C3). More specifically, as shown in FIG. 12, the reference point $Sp1_{S2}$ corresponding to the reference point Sp1 is set to the one secondary reduced frame (for example, the frames $Ma1_{S2}$ and $Ma2_{S2}$). Furthermore, the processing target point $Pp1_{S2}$ corresponding to the corresponding point detected at the step (C3) is set to the other secondary reduced frame (for example, the frames $Md1_{S2}$ and $Mb2_{S2}$).

(C5) As shown in FIG. 12, a window (which will also be referred to as a reference region) $Wa_{S2}$ included around the reference point $Sp1_{S2}$ is set into the one secondary reduced frame (for example, the one secondary reduced frames $Ma1_{S2}$ and $Ma2_{S2}$). Moreover, a window (which will also be referred to as a comparison region) $Wb_{S2}$ included around the processing target point $Pp1_{S2}$ is set into the other secondary reduced frame (for example, the other secondary reduced frames $Md1_{S2}$ and $Mb2_{S2}$). The reference region $Wa_{S2}$ and the comparison region $Wb_{S2}$ are regions taking the same shape and size as the reference region $Wa_{S3}$ and the comparison region $Wb_{S3}$.

(C6) By using the POC method, a correlation between the reference region $Wa_{S2}$ and the comparison region $Wb_{S2}$ is calculated so that the corresponding point is detected on the other secondary reduced frame.

Figure 13:
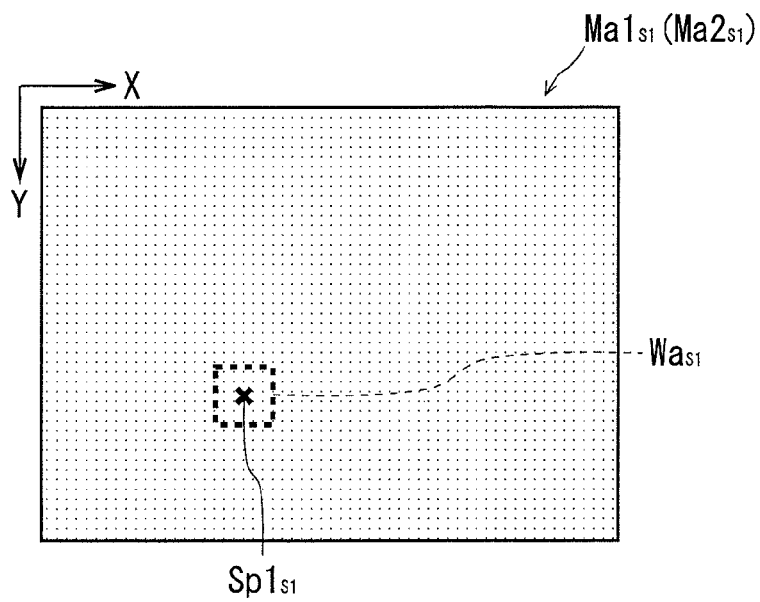
FIG. 13 is a schematic diagram showing an example in which the window is set to the first reduced frame.
Figure 14:
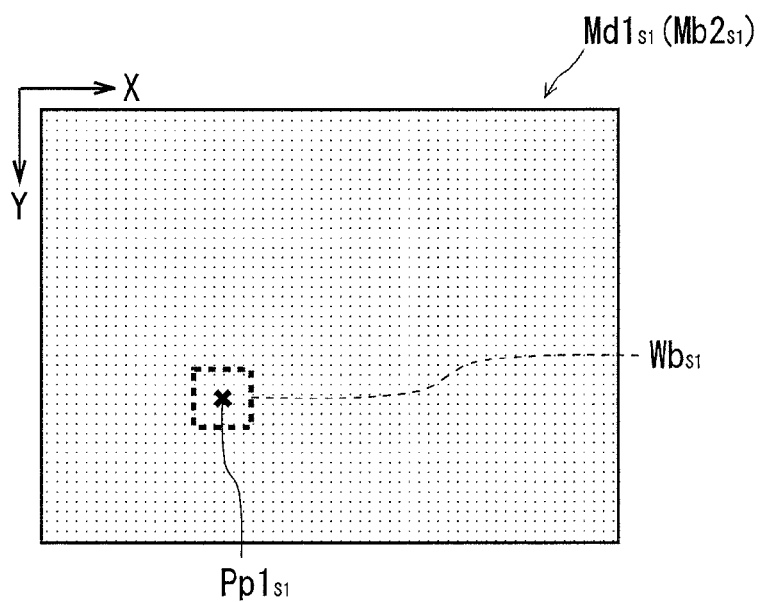
FIG. 14 is a schematic diagram showing an example in which the window is set to the first reduced frame.

(C7) A reference parallax is temporarily set to a set of first reduced frames. The reference parallax is set based on a result of the detection at the step (C6). In detail, the reference parallax corresponds to a shift quantity of the X coordinate between a position of the reference point $Sp1_{S2}$ in the one secondary reduced frames and a position of the corresponding point in the other secondary reduced frame detected at the step (C6). More specifically, as shown in FIG. 13, the reference point $Sp1_{S1}$ corresponding to the reference point Sp1 is set to the one first reduced frame (for example, the frames $Ma1_{S1}$ and $Ma2_{S1}$). As shown in FIG. 14, furthermore, the processing target point $Pp1_{S1}$ corresponding to the corresponding point detected at the step (C6) is set to the other first reduced frame (for example, the frames $Md1_{S1}$ and $Mb2_{S1}$).

(C8) As shown in FIG. 13, a window (which will also be referred to as a reference region) $Wa_{S1}$ included around the reference point $Sp1_{S1}$ is set into the one first reduced frame (for example, the one first reduced frames $Ma1_{S1}$ or $Ma2_{S1}$). As shown in FIG. 14, moreover, a window (which will also be referred to as a comparison region) $Wb_{S1}$ included around the processing target point $Pp1_{S1}$ is set into the other first reduced frame (for example, the other first reduced frames $Md1_{S1}$ and $Mb2_{S1}$). The reference region $Wa_{S1}$ and the comparison region $Wb_{S1}$ are regions taking the same shape and size as the reference regions $Wa_{S2}$ and $Wa_{S3}$ and the comparison regions $Wb_{S2}$ and $Wb_{S3}$.

(C9) By using the POC method, a correlation between the reference region $Wa_{S1}$ and the comparison region $Wb_{S1}$ is calculated so that the corresponding point is detected on the other first reduced frame.

Figure 16:
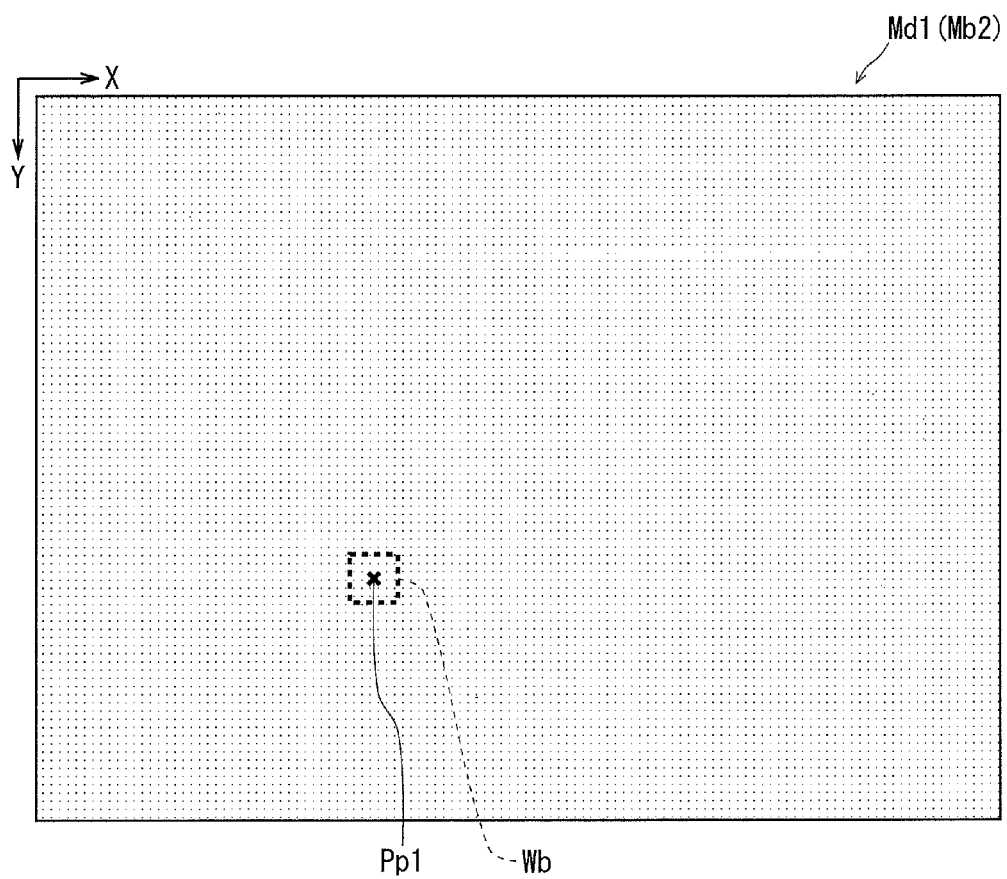
FIG. 16 is a schematic diagram showing an example in which the window is set to each frame.

(C10) A reference parallax is temporarily set to a set of frames. The reference parallax is set based on a result of the detection at the step (C9). In detail, the reference parallax corresponds to a shift quantity of the X coordinate between a position of the reference point $Sp1_{S2}$ in the one first reduced frame and a position of the corresponding point in the other first reduced frame detected at the step (C9). More specifically, as shown in FIG. 15, the reference point Sp1 is set to the one frame (for example, the frames Ma1 and Ma2). As shown in FIG. 16, furthermore, the processing target point Pp1 corresponding to the corresponding point detected at the step (C9) is set to the other frames (for example, the frames Md1 and Mb2).

(C11) As shown in FIG. 15, a window (which will also be referred to as a reference region) Wa included around the reference point Sp1 is set into the one frame (for example, the one frames Ma1 and Ma2). Moreover, a window (which will also be referred to as a comparison region) Wb included around the processing target point Pp1 is set into the other frame (for example, the other frames Md1 and Mb2). The reference region Wa and the comparison region Wb are regions taking the same shape and size as the reference regions $Wa_{S1}$, $Wa_{S2}$ and $Wa_{S3}$ and the comparison regions $Wb_{S1}$, $Wb_{S2}$ and $Wb_{S3}$.

(C12) By using the POC method, a correlation between the reference region Wa and the comparison region Wb is calculated so that the corresponding point is detected on the other frame.

Returning to FIG. 2, the distance measuring portion 423 derives a distance D from the stereo camera 2 (that is, a viewpoint) to a subject based on a parallax Δd obtained from the coordinates of the reference point and the corresponding point which are detected by the searching portion 422 by using the principle of triangulation every reference point for the frames of each set. Herein, there is utilized the fact that the distance D, an offset distance B between the optical axes of the first and second cameras 2a and 2b, a focal length f of the lens of the stereo camera 2 and the parallax Δd have a relationship of D=f×B/Δd, and the offset distance B and the focal length f are univocally set by a design. Information about the distance D related to each reference point derived by the distance measuring portion 423 is output from the computing portion 42 and is stored in the storage portion 404 or the like.

<(1-3) Method of Detecting Corresponding Point using POC Method>

A method of detecting a corresponding point using the POC method to be executed by the searching portion 422 includes a detecting method related to an I detection processing and a detecting method related to a P detection processing.

<(1-3-1) Method of Detecting Corresponding Point using POC Method related to I Detection Processing>

Figure 17:
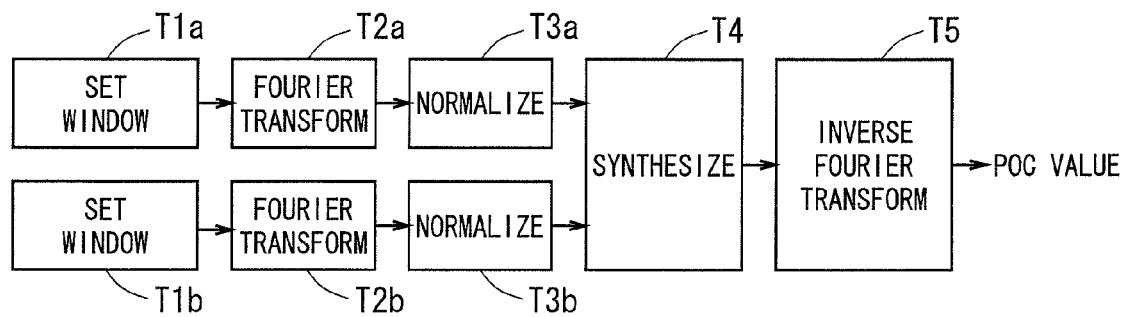
FIG. 17 is a diagram illustrating a functional configuration related to an I detection processing using a POC method.

FIG. 17 is a diagram for specifically explaining a method of detecting a corresponding point using the POC method related to the I detection processing. Herein, description will be given by taking, as an example, a method of detecting a corresponding point between one frame and the other frame.

First of all, there are executed a processing T1a for setting a window (a reference region) Wa to the one frame and a processing T1b for setting a window (a comparison region) Wb to the other frame. At this time, image regions corresponding to the reference region Wa and the comparison region Wb respectively are expressed in the following Equation 1.

$$f(n_1, n_2), \text{ size } N_1 \times N_2, n_1 = -M_1, \ldots, M_1$$

$$g(n_1, n_2), \text{ size } N_1 \times N_2, n_2 = -M_2, \ldots, M_2 \quad \text{[Equation 1]}$$

Herein, $f(n_1, n_2)$ in the Equation 1 represents the reference region Wa on the one frame and $g(n_1, n_2)$ in the Equation 1 represents the comparison region Wb on the other frame. Moreover, $N_1$ and $N_2$ are set to be $N_1=2M_1+1$ and $N_2=2M_2+1$, for example.

Next, two-dimensional Fourier transform processings T2a and T2b using an arithmetic expression shown in the following Equation 2 are carried out over each image region corresponding to the reference region Wa and the comparison region Wb of the one frame and the other frame.

$$F(k_1, k_2) = \sum_{n_1, n_2} f(n_1, n_2) W_{N_1}^{k_1 n_1} W_{N_2}^{k_2 n_2} \quad \text{[Equation 2]}$$

$$G(k_1, k_2) = \sum_{n_1, n_2} g(n_1, n_2) W_{N_1}^{k_1 n_1} W_{N_2}^{k_2 n_2}$$

$$W_P = \text{EXP}\left(-j\frac{2\pi}{P}\right), k_s = -M_s, \ldots, M_s$$

wherein $N_1$ and $N_2$ are substituted for a subscript P of W, and 1 and 2 are substituted for a subscript s of k in a proviso of the Equation 2.

For each of the image regions subjected to the Fourier transform processings T2a and T2b, an arithmetic expression shown in the following Equation 3 is used to execute normalization processings T3a and T3b for removing an amplitude component of an image respectively.

$$F'(k_1, k_2) = \frac{F(k_1, k_2)}{|F(k_1, k_2)|}, G'(k_1, k_2) = \frac{G(k_1, k_2)}{|G(k_1, k_2)|} \quad \text{[Equation 3]}$$

When the normalization processings T3a and T3b are completed, a synthesis processing T4 using an arithmetic expression shown in the following Equation 4 is executed and a two-dimensional inverse Fourier transform processing T5 using an arithmetic expression shown in the following Equation 5 is executed. Consequently, a correlation operation between images is executed and a result thereof (a POC value) is output.

$$R(k_1, k_2) = F'(k_1, k_2)\overline{G'(k_1, k_2)} \quad \text{[Equation 4]}$$

$$r(k_1, k_2) = \frac{1}{N_1 N_2} \sum_{k_1, k_2} R(k_1, k_2) W_{N_1}^{-k_1 n_1} W_{N_2}^{-k_2 n_2} \quad \text{[Equation 5]}$$

Figure 18:
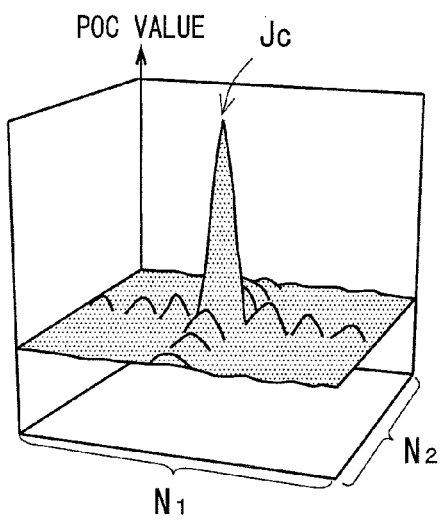
FIG. 18 is a chart illustrating a distribution of a POC value.

By the processings described above, a calculation result (a distribution of the POC value) indicative of the correlation between the reference region Wa and the comparison region Wb is obtained as shown in FIG. 18.

In FIG. 18, the POC value in a portion having a high correlation in a window ($N_1 \times N_2$) is increased and a position corresponding to a peak Jc of the POC value in the comparison region Wb on the other frame is equivalent to a corresponding point on the other frame corresponding to a central point (a reference point) Sp1 of the reference region Wa on the one frame. For this reason, the peak Jc of the POC value is detected so that the corresponding point on the other frame corresponding to the reference point Sp1 on the one frame is detected.

According to the processing for detecting a corresponding point by using the POC method, an amplitude component of an image is removed and the correlation operation is carried out by only a phase component of the image. Therefore, it is possible to suppress a fluctuation in a luminance or the influence of a noise, thereby detecting a corresponding point with high precision.

<(1-3-2) Method of Detecting Corresponding Point Using POC Method Related to P Detection Processing>

In a P detection processing, motion information included in a set of P pictures is used to detect a corresponding point which corresponds to a reference point. Specific description will be given below.

Figure 19:
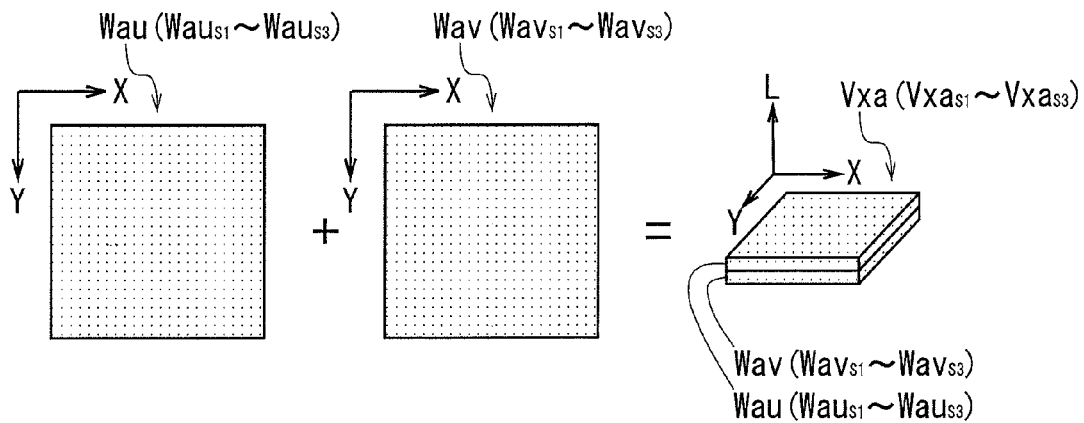
FIG. 19 is a diagram for explaining a principle of a P detection processing.

The P picture includes, for each pixel, motion information about an X direction (which will also be referred to as motion information X) and motion information about a Y direction (which will also be referred to as motion information Y). In other words, the P picture includes a distribution of the motion information X and a distribution of the motion information Y. As shown in FIG. 19, therefore, the reference region Wa set to the P picture includes a two-dimensional distribution Wau of the motion information X related to the reference region Wa (which will also be referred to as an X distribution or one reference distribution) and a two-dimensional distribution Wav of the motion information Y related to the reference region Wa (which will also be referred to as a Y distribution or the other reference distribution). As shown in FIG. 19, accordingly, data on the reference region Wa can be treated as an image region Vxa (which will also be referred to as voxel information) taking a shape of a rectangular parallelepiped which is formed by laminating the X distribution Wau and the Y distribution Wav. Herein, it is assumed that a direction in which the X distribution Wau and the Y distribution Wav are laminated is an L direction which is perpendicular to an XY plane.

Figure 20:
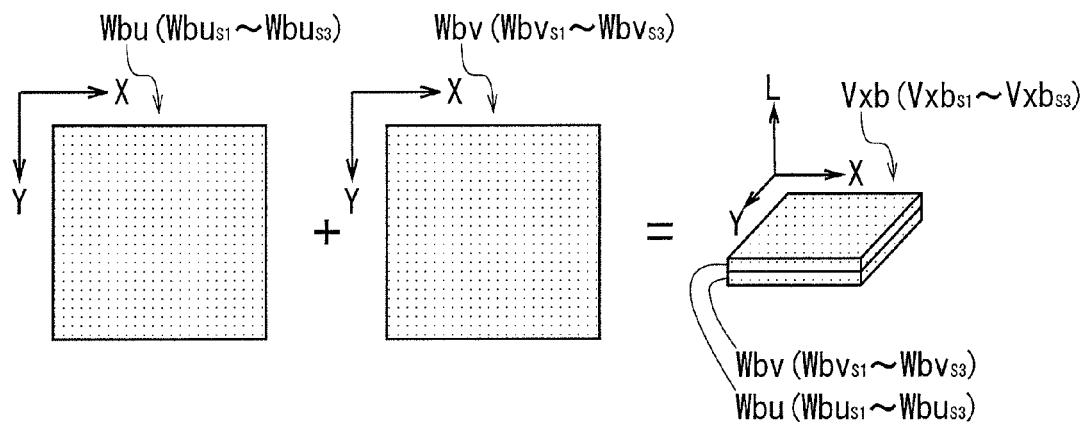
FIG. 20 is a diagram for explaining the principle of the P detection processing.

As shown in FIG. 20, moreover, the comparison region Wb set to the P picture includes a two-dimensional distribution Wbu of the motion information X related to the comparison region Wb (which will also be referred to as an X distribution or one comparison distribution) and a two-dimensional distribution Wbv of the motion information Y related to the comparison region Wb (which will also be referred to as a Y distribution or the other comparison distribution). As shown in FIG. 20, accordingly, data on the comparison region Wb can be treated as an image region Vxb (which will also be referred to as voxel information) taking a shape of a rectangular parallelepiped which is formed by laminating the X distribution Wbu and the Y distribution Wbv in the L direction.

A distribution of a POC value indicative of a correlation between the voxel information Vxa and the voxel information Vxb is obtained, and coordinates of a point in which a point having a maximum POC value is projected onto the XY plane are detected as a corresponding point.

Figure 21:
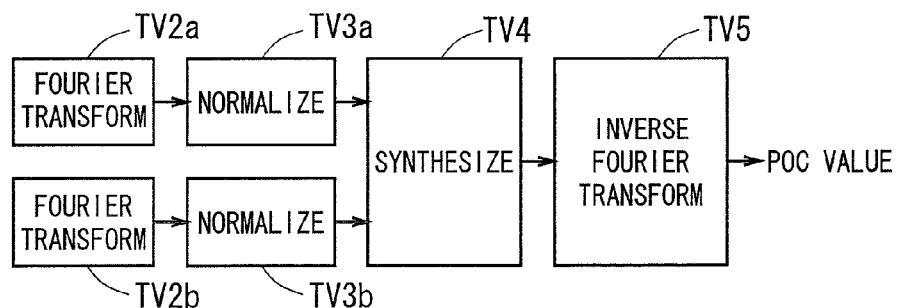
FIG. 21 is a diagram illustrating a functional configuration related to the P detection processing using the POC method.

FIG. 21 is a diagram for specifically explaining how to obtain the distribution of the POC value in the P detection processing.

Herein, the voxel information Vxa and the voxel information Vxb are treated as image regions (the voxel information) taking the shape of a rectangular parallelepiped in which a predetermined number $N_1$ of pixels are arranged in the X direction, a predetermined number $N_2$ of pixels are arranged in the Y direction and a predetermined number $N_3$ (herein, two) pixels are arranged in the L direction. These voxel information are expressed in the following Equation 6.

$$f(n_1, n_2, n_3) \text{ size } N_1 \times N_2 \times N_3$$

$$g(n_1, n_2, n_3) \text{ size } N_1 \times N_2 \times N_3 \qquad \text{[Equation 6]}$$

wherein $n_1 = -M_1, \ldots, M_1$
$n_2 = -M_2, \ldots, M_2$
$n_3 = -M_3, \ldots, M_3$ $f(n_1, n_2, n_3)$ in the Equation 6 indicates the voxel information Vxa, and $g(n_1, n_2, n_3)$ in the Equation 6 indicates an image region related to the voxel information Vxb. Moreover, $N_1$, $N_2$ and $N_3$ are set to be $N_1 = 2M_1 + 1$, $N_2 = 2M_2 + 1$ and $N_3 = 2M_3 + 1$, for example.

First of all, three-dimensional Fourier transform processings TV2a and TV2b using an arithmetic expression shown in the following Equation 7 are carried out over the voxel information Vxa and the voxel information Vxb.

$$F(k_1, k_2, k_3) = \sum_{n_1, n_2, n_3} f(n_1, n_2, n_3) W_{N_1}^{k_1 n_1} W_{N_2}^{k_2 n_2} W_{N_3}^{k_3 n_3} \qquad \text{[Equation 7]}$$

$$G(k_1, k_2, k_3) = \sum_{n_1, n_2, n_3} g(n_1, n_2, n_3) W_{N_1}^{k_1 n_1} W_{N_2}^{k_2 n_2} W_{N_3}^{k_3 n_3}$$

$$W_P = \text{EXP}\left(-j\frac{2\pi}{P}\right), k_s = -M_s, \ldots, M_s$$

wherein
$N_1$, $N_2$ and $N_3$ are substituted for a subscript P of W in a proviso of the Equation 7, and 1, 2 and 3 are substituted for a subscript s of k.

For each of the image regions subjected to the Fourier transform processings TV2a and TV2b, an arithmetic expression shown in the following Equation 8 is used to execute normalization processings TV3a and TV3b for removing an amplitude component of an image.

$$F'(k_1, k_2, k_3) = \frac{F(k_1, k_2, k_3)}{|F(k_1, k_2, k_3)|}, \qquad \text{[Equation 8]}$$

$$G'(k_1, k_2, k_3) = \frac{G(k_1, k_2, k_3)}{|G(k_1, k_2, k_3)|}$$

When the normalization processings TV3a and TV3b are completed, a synthesis processing TV4 using an arithmetic expression shown in the following Equation 9 is executed and a three-dimensional inverse Fourier transform processing TV5 using an arithmetic expression shown in the following Equation 10 is executed. Consequently, a correlation operation between images is executed and a result thereof (a distribution of a POC value) is output.

$$R(k_1, k_2, k_3) = F'(k_1, k_2, k_3)\overline{G'(k_1, k_2, k_3)} \qquad \text{[Equation 9]}$$

$$r(k_1, k_2, k_3) = \qquad \text{[Equation 10]}$$
$$\frac{1}{N_1 N_2 N_3} \sum_{k_1, k_2, k_3} R(k_1, k_2, k_3) W_{N_1}^{-k_1 n_1} W_{N_2}^{-k_2 n_2} W_{N_3}^{-k_3 n_3}$$

Although the distribution of the POC value is thus obtained, the operation for obtaining the distribution of the POC value from the voxel information Vxa and the voxel information Vxb has a computation increased more greatly than the operation for obtaining the distribution of the POC value in the I detection processing. In consideration of a suppression in the increase in the computation, therefore, it is preferable that the size (the $N_1$ and $N_2$) of the window (the reference region and the comparison region) in the P detection processing should be set to be smaller than that of the I detection processing. For example, it is sufficient that $N_2$ is halved.

Referring to the detection of the corresponding point related to any of the set of the one first reduced frame and the other first reduced frame, the set of the one secondary reduced frame and the other secondary reduced frame, and the set of the one tertiary reduced frame and the other tertiary reduced frame, similarly, it is possible to implement the detection by the same method as that in the detection of the corresponding point related to the set of the one frame and the other frame.

For example, the data on the reference region $Wa_{S1}$ can also be treated as the voxel information $Vxa_{S1}$ of the rectangular parallelepiped having the X distribution $Wau_{S1}$ and the Y distribution $Wav_{S1}$ laminated in the L direction, and the data on the comparison region $Wb_{S1}$ can also be treated as the voxel information $Vxb_{S1}$ of the rectangular parallelepiped having the X distribution $Wbu_{S1}$ and the Y distribution $Wbv_{S1}$ laminated in the L direction. Moreover, the data on the reference region $Wa_{S2}$ can also be treated as the voxel information $Vxa_{S2}$ of the rectangular parallelepiped having the X distribution $Wau_{S2}$ and the Y distribution $Wav_{S2}$ laminated in the L direction, and the data on the comparison region $Wb_{S2}$ can also be treated as the voxel information $Vxb_{S2}$ of the rectangular parallelepiped having the X distribution $Wbu_{S2}$ and the Y distribution $Wbv_{S2}$ laminated in the L direction. Furthermore, the data on the reference region $Wa_{S3}$ can also be treated as the voxel information $Vxa_{S3}$ of the rectangular parallelepiped having the X distribution $Wau_{S3}$ and the Y distribution $Wav_{S3}$ laminated in the L direction, and the data on the comparison region $Wb_{S3}$ can also be treated as the voxel information $Vxb_{S3}$ of the rectangular parallelepiped having the X distribution $Wbu_{S3}$ and the Y distribution $Wbv_{S3}$ laminated in the L direction.

<(1-4) Operation of Information Processing System>

Figure 24:
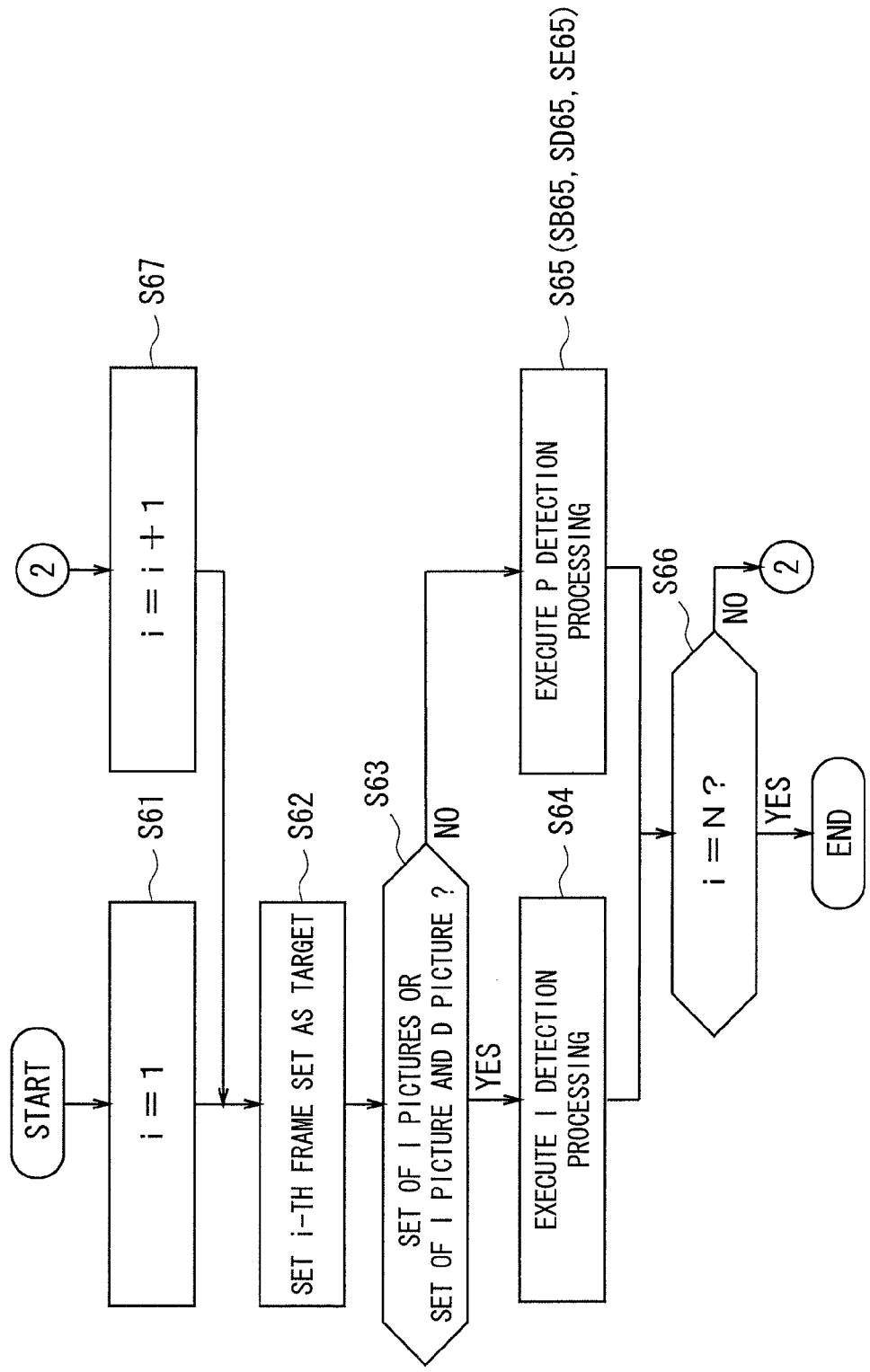
FIG. 24 is a flow chart showing the operation flow of the information processing system.

FIGS. 22 to 24 are flow charts showing an operation flow in the information processing system 1. The present operation flow is implemented by reading and executing the program PG through the control portion 406. The present operation flow is started in response to an instruction sent from the operating portion 401 and the processing proceeds to Step S1 in FIG. 22, for example.

At the Step S1, first and second dynamic images are acquired by an image pickup through the image pickup portions 21a and 21b.

At the Step S2, a moving picture compression is carried out over the first and second dynamic images through the compressing portions 22a and 22b so that the first and second compressed dynamic images Ma and Mb are generated and output to the transmitting portions 23a and 23b.

At Step S3, the first and second compressed dynamic images Ma and Mb are transmitted to the information processing device 4 through the transmitting portions 23a and 23b.

At Step S4, the first and second compressed dynamic images Ma and Mb are received by the receiving portions 41a and 41b and are output to the expanding portion 421.

At Step S5, the P picture included in the first and second compressed dynamic images Ma and Mb is expanded if necessary by the expanding portion 421 so that the D picture is generated. At the Step S5, an operation flow shown in FIG. 23 is carried out so that the first and second compressed dynamic images Maa and Mbb are generated.

At Step S51, a numeric value i indicating order of the set of frames to be a processing target in the first and second compressed dynamic images Ma and Mb is set to be one.

At Step S52, an i-th set of frames in the first and second compressed dynamic images Ma and Mb is set to be a processing target.

At Step S53, it is decided whether the i-th set of frames is a set of I pictures or not. If the i-th set of frames is not the set of I pictures, the processing proceeds to Step S54. If the i-th set of frames is the set of I pictures, the processing proceeds to Step S55.

At the Step S54, it is decided whether the i-th set of frames is a set of P pictures or not. If the i-th set of frames is the set of P pictures, the processing proceeds to the Step S55. If the i-th set of frames is not the set of P pictures, the processing proceeds to Step S56.

At the Step S55, an expansion for the i-th set of frames is prohibited. In other words, the i-th set of frames is not expanded at all by the expanding portion 421 but the i-th set of frames is exactly output to the searching portion 422.

At the Step S56, the P picture included in the i-th set of frames is expanded.

At Step S57, it is decided whether the numeric value i is N or not. N represents the number of the frames constituting the first and second compressed dynamic images Ma and Mb, respectively. Herein, if the numeric value i is not N, the processing proceeds to Step S58 and the numeric value i is increased by one so that the processing proceeds to the Step S52. On the other hand, if the numeric value i is N, the present operation flow is ended.

At Step S6 of FIG. 22, next, a corresponding point is detected by the searching portion 422. At the Step S6, an operation flow shown in FIG. 24 is carried out.

At Step S61, a numeric value i indicating order of the set of frames to be a processing target in the first and second compressed dynamic images Maa and Mbb is set to be one.

At Step S62, an i-th set of frames in the first and second compressed dynamic images Maa and Mbb is set to be a processing target.

At Step S63, it is decided whether the i-th set of frames is a set of I pictures or a set of I and D pictures. If the i-th set of frames is the set of I pictures or the set of I and D pictures, the processing proceeds to Step S64. If the i-th set of frames is neither the set of I pictures nor the set of I and D pictures, the processing proceeds to Step S65.

At the Step S64, the I detection processing is carried out.

At the Step S65, the P detection processing is carried out.

At Step S66, it is decided whether the numeric value i is N or not. N represents the number of the frames constituting the first and second compressed dynamic images Maa and Mbb, respectively. Herein, if the numeric value i is not N, the processing proceeds to Step S67 and the numeric value i is increased by one so that the processing proceeds to the Step S62. On the other hand, if the numeric value i is N, the present operation flow is ended.

At Step S7 of FIG. 22, next, the distance D to the subject is derived for each set of frames included in the first and second compressed dynamic images Maa and Mbb based on the corresponding point detected at the Step S6 by the distance measuring portion 423.

<(1-5) Conclusion of First Embodiment>

In the information processing system 1 according to the first embodiment as described above, referring to the set of P pictures, the P pictures are not expanded but the P detection processing is carried out. For this reason, there is reduced the computation related to the detection of the corresponding point setting the compressed dynamic image as a target. Moreover, the P picture included in the set of I and P pictures is expanded and is thus changed into the D picture so that the I detection processing is carried out. Therefore, it is possible to detect the corresponding point for a set of frames having a different configuration while suppressing an increase in the computation.

<(2) Second Embodiment>

In the information processing system 1 according to the first embodiment, referring to the set of I and P pictures, the P picture is expanded and is thus changed into the D picture, and furthermore, the I detection processing is carried out. On the other hand, in an information processing system 1A according to a second embodiment, there is carried out a dynamic image compression which does not cause the set of I and P pictures. Consequently, a calculation for matching frame configurations is reduced so that a computation related to a detection of a corresponding point is decreased. Description will be given to different respects in the information processing system 1A according to the second embodiment from the information processing system 1 according to the first embodiment.

<(2-1) Functional Configuration of Information Processing System>

Figure 25:
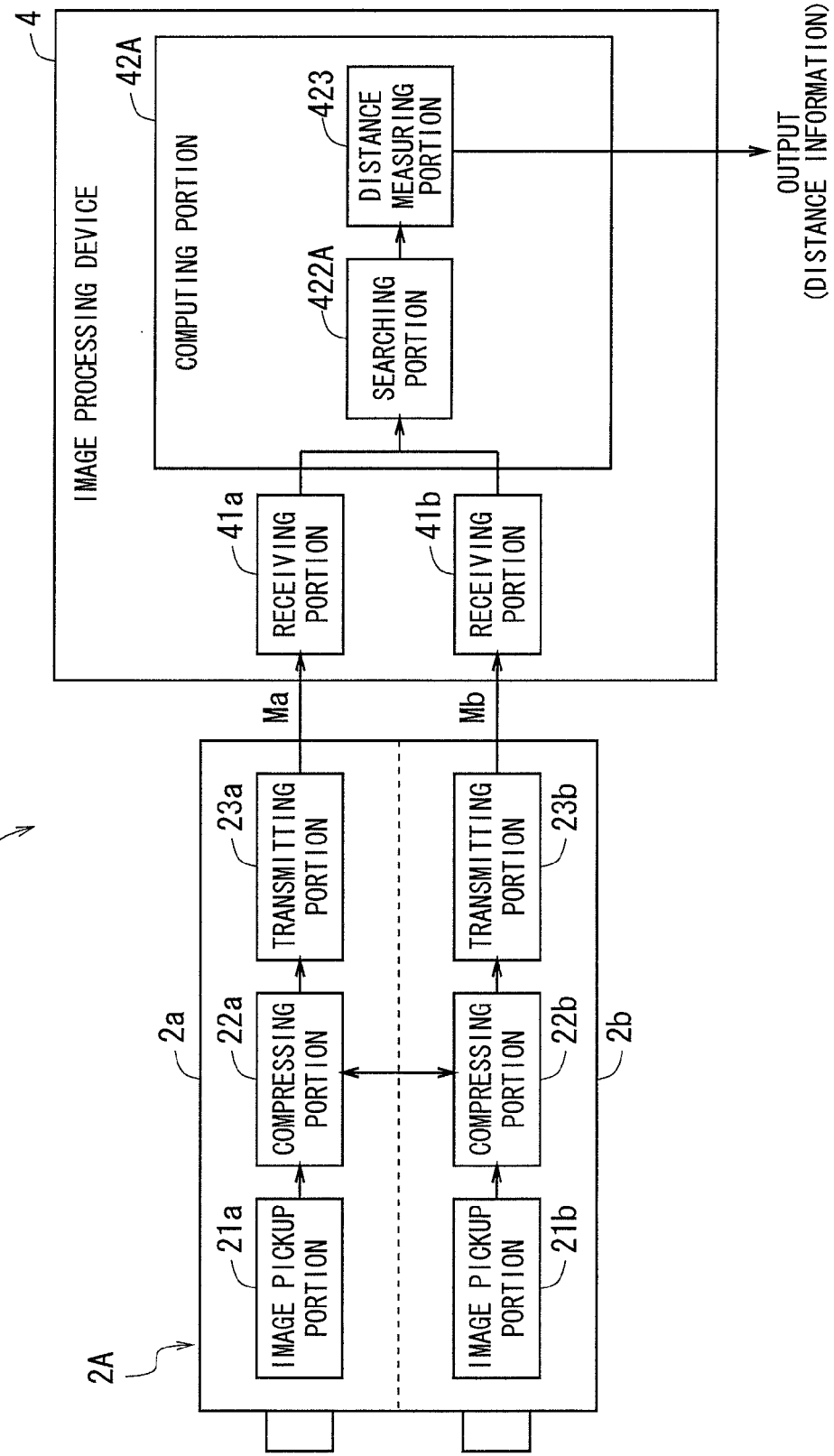
FIG. 25 is a diagram showing a functional configuration of the information processing system according to the second embodiment.

FIG. 25 is a diagram showing a functional configuration of the information processing system 1A.

In the information processing system 1A, based on the information processing system 1 according to the first embodiment, the stereo camera 2 is changed into a stereo camera 2A in which moving picture compressions in the compressing portions 22a and 22b are synchronous with each other, and the computing portion 42 is changed into a computing portion 42A in which the expanding portion 421 is removed and the searching portion 422 is replaced with the searching portion 422A.

In the stereo camera 2A, the compressing portions 22a and 22b are operated in such a manner that frames in each set between a first dynamic image and a second dynamic image make either a set of I pictures or a set of P pictures, thereby generating first and second compressed dynamic images Ma and Ma. The operation for the synchronous moving picture compressions in the compressing portions 22a and 22b can be implemented by a control of a control portion provided in the stereo camera 2A, a control portion 406 or the like.

Figure 26:
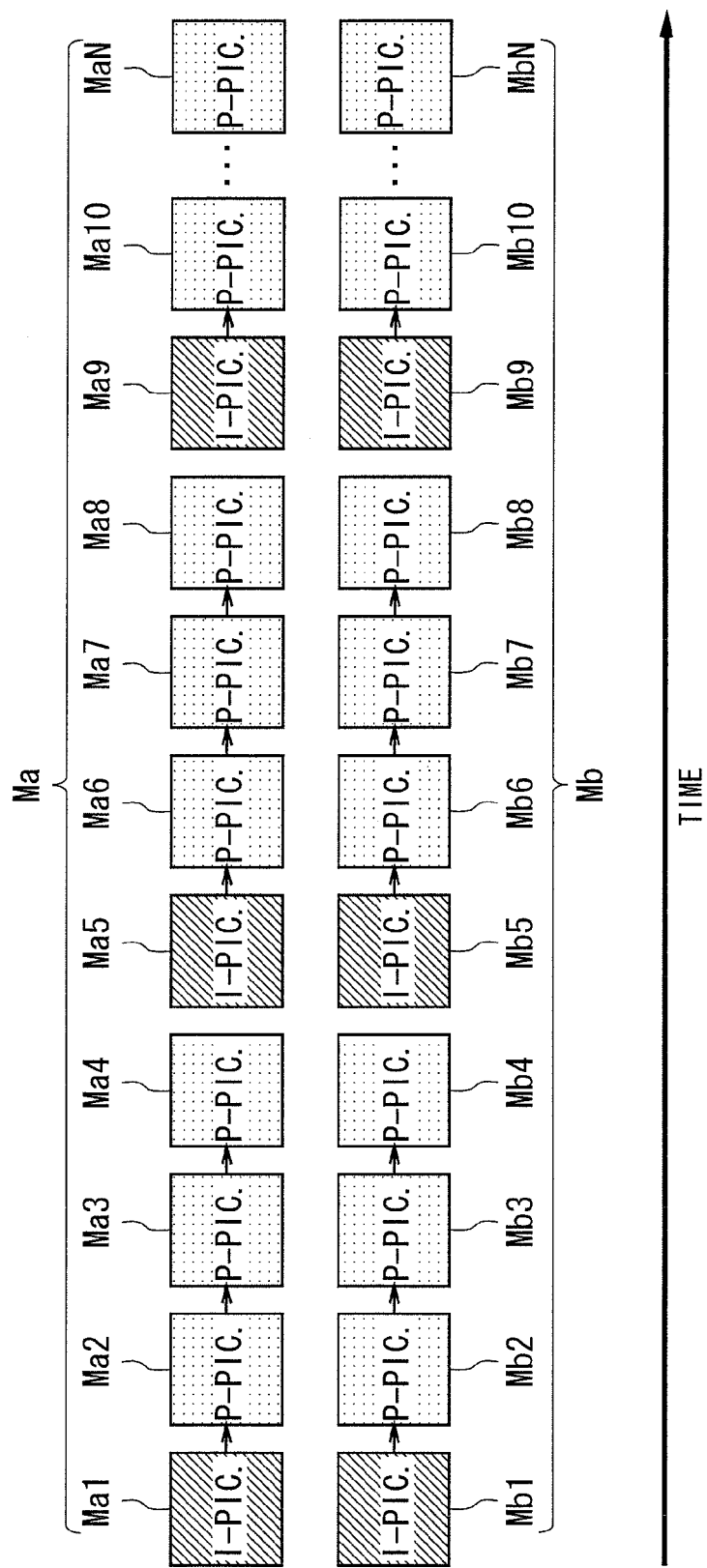
FIG. 26 is a diagram for explaining a compressing manner and a detection processing according to the second embodiment.

FIG. 26 illustrates the first and second compressed dynamic images Ma and Mb generated in the stereo camera 2A. Herein, sets of frames at an interval of four frames, that is, a first set of frames Ma1 and Mb1, a fifth set of frames Ma5 and Mb5 and a ninth set of frames Ma9 and Mb9 are sets of I pictures, and residual sets of frames are sets of P pictures.

Thus, each set of frames is a set of I pictures or a set of P pictures. For this reason, it is not necessary to expand the P picture in the computing portion 42A.

The function of the computing portion 42A (more specifically, the searching portion 422A and a distance measuring portion 423) is implemented by an execution of a program PGA stored in a storage portion 404 through the control portion 406. A detection processing to be carried out by the searching portion 422A includes an I detection processing and a P detection processing.

<(2-2) Operation of Information Processing System>

Figure 28:
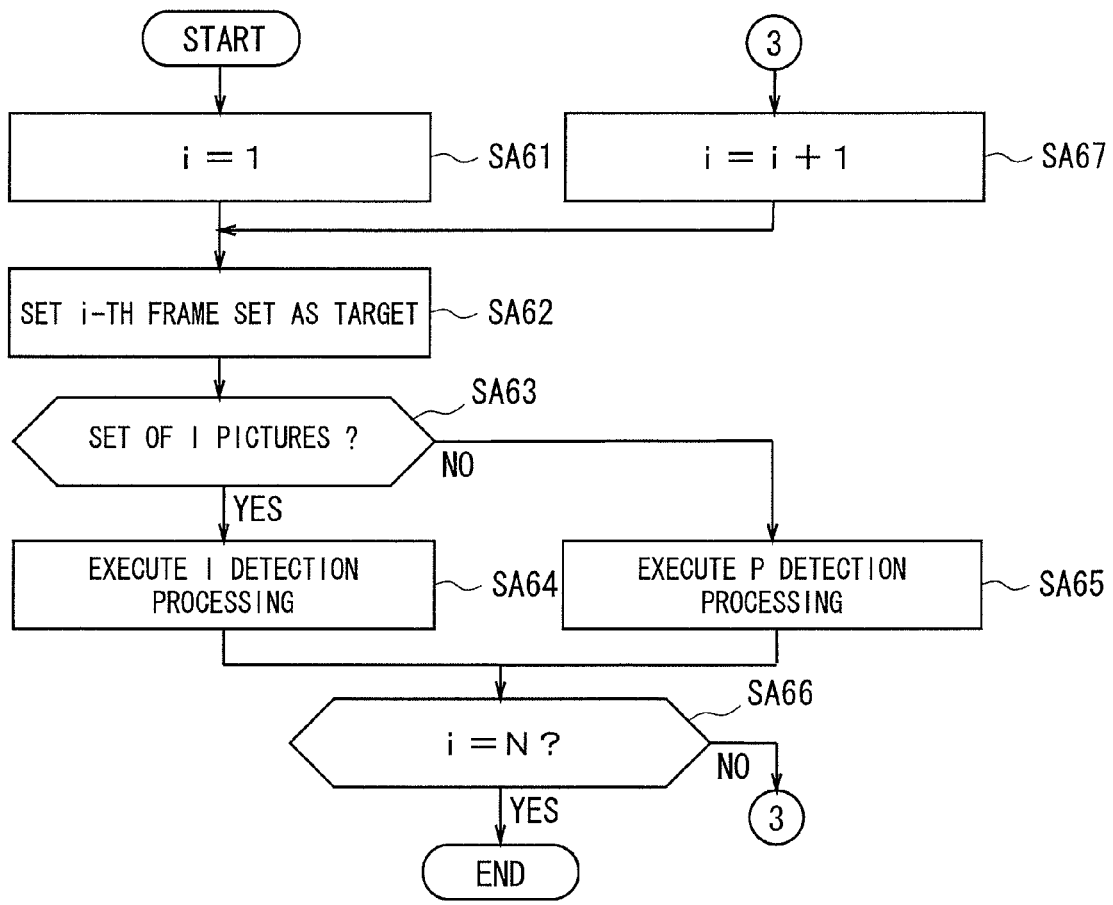
FIG. 28 is a flow chart showing an operation flow of the information processing system.

FIGS. 27 and 28 are flow charts showing an operation flow in the information processing system 1A. The present operation flow is implemented by reading and executing a program PGA in the storage portion 404 through the control portion 406. The present operation flow is started in response to an instruction sent from an operating portion 401 and the processing proceeds to Step S1 in FIG. 27, for example.

Referring to the operation flow shown in FIG. 27, in the operation flow of the information processing system 1 according to the first embodiment illustrated in FIG. 22, the processing of the Step S2 is replaced with Step S2A, the processing of the Step S5 is removed, and the processing of the Step S6 is replaced with Step S6A. At Step S4, the first and second compressed dynamic images Ma and Mb are output from receiving portions 41a and 41b to the searching portion 422A.

At the Step SA2, a moving picture compression is carried out over the first and second dynamic images through the compressing portions 22a and 22b so that the first and second compressed dynamic images Ma and Mb are generated and output to the transmitting portions 23a and 23b. Herein, respective sets of frames included in the first and second compressed dynamic images Ma and Mb are sets of I pictures or the sets of P pictures.

At Step SA6, a processing for detecting a corresponding point is carried out by the searching portion 422A. At the Step SA6, an operation flow shown in FIG. 28 is carried out.

At Step SA61, a numeric value i indicating order of the set of frames to be a processing target in the first and second compressed dynamic images Ma and Mb is set to be one.

At Step SA62, an i-th set of frames in the first and second compressed dynamic images Ma and Mb is set to be a processing target.

At Step SA63, it is decided whether the i-th set of frames is a set of I pictures or not. If the i-th set of frames is the set of I pictures, the processing proceeds to Step SA64. If the i-th set of frames is not the set of I pictures, the processing proceeds to Step SA65.

At the Step SA64, the I detection processing is carried out.
At the Step SA65, the P detection processing is carried out.
At Step SA66, it is decided whether the numeric value i is N or not. N represents the number of frames constituting the first and second compressed dynamic images Ma and Mb, respectively. If the numeric value i is not N, the processing proceeds to Step SA67 and the numeric value i is increased by one so that the processing proceeds to the Step SA62. On the other hand, if the numeric value i is N, the present operation flow is ended.

<(2-3) Conclusion of Second Embodiment>

As described above, in the information processing system 1A according to the second embodiment, it is not necessary to expand the P picture through the synchronization of the moving picture compression for the first and second dynamic images. Therefore, a calculation for matching a configuration of the frame is reduced so that a computation related to the detection of the corresponding point is decreased.

<(3) Third Embodiment>

In the information processing systems 1 and 1A according to the first and second embodiments, the corresponding point is detected for the set of P pictures based on the correlation between the motion information about one of the P pictures and the motion information about the other P picture. On the other hand, in an information processing system 1B according to a third embodiment, a corresponding point is detected for a set of P pictures based on a result of an I detection processing and motion information possessed by a P picture. In other words, there is a difference in contents of a P detection processing. Consequently, a necessary computation for the P detection processing is reduced remarkably and a computation required for detecting a corresponding point related to the P picture is reduced considerably. Description will be given to different respects in the information processing system 1B according to the third embodiment from the information processing system 1 according to the first embodiment.

In the information processing system 1B, as shown in FIG. 2, the computing portion 42 is changed into a computing portion 42B in which the searching portion 422 is replaced with a searching portion 422B based on the information processing system 1 according to the first embodiment. The function of the computing portion 42B (more specifically, the expanding portion 421, the searching portion 422B and the distance measuring portion 423) is implemented by an execution of a program PGB stored in a storage portion 404 through a control portion 406.

In the searching portion 422B, a P detection processing setting a set of P pictures as a target is carried out based on a result of a detection in an I detection processing intended for a set of I pictures or a set of I and D pictures and motion information included in a set of P pictures. In other words, referring to the set of P pictures, a reference point and a corresponding point which corresponds to the reference point are indirectly obtained based on the result of the detection in the I detection processing and the motion information.

Figure 29:
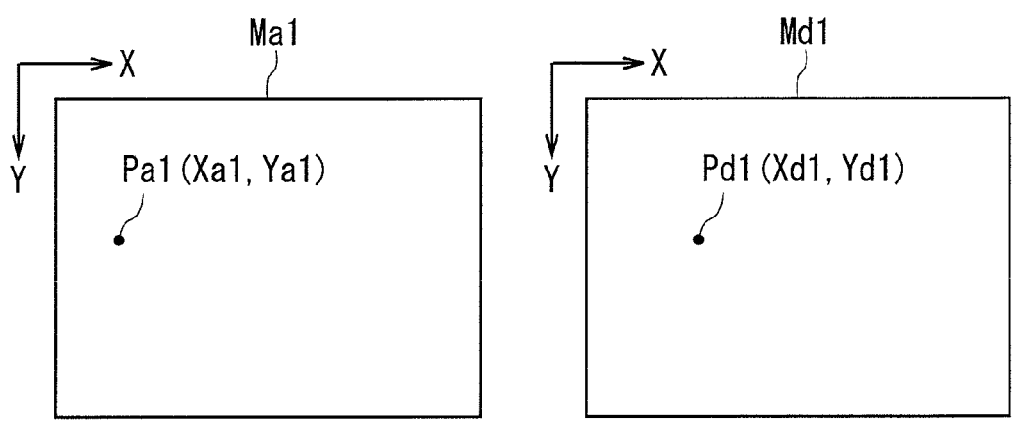
FIG. 29 is a diagram for explaining a principle of a P detection processing according to a third embodiment.
Figure 30:
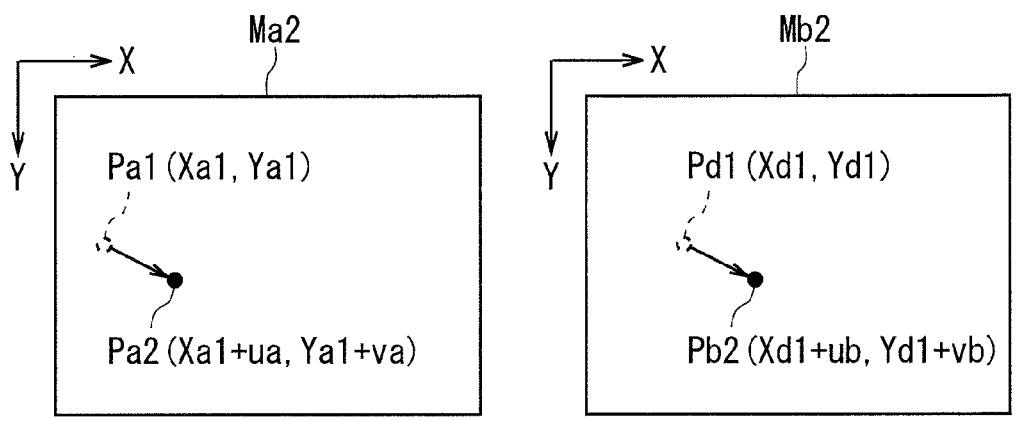
FIG. 30 is a diagram for explaining the principle of the P detection processing according to the third embodiment.

FIGS. 29 and 30 are diagrams for explaining a principle of the P detection processing according to the present embodiment. FIG. 29 shows an example of the result of the detection in the I detection processing. Referring to a set of an I picture Ma1 and a D picture Md1, there is shown a corresponding point Pd1 (an X coordinate is Xd1 and a Y coordinate is Yd1) corresponding to a reference point Pa1 (an X coordinate is Xa1 and a Y coordinate is Ya1).

As shown in FIG. 30, in the searching portion 422B, a reference point Pa2 corresponding to a reference point Pa1 of the I picture Ma1 in a P picture Ma2 to be a next frame of the I picture Ma1 is derived based on motion information included in the P picture Ma2 for the first compressed dynamic image Maa. For example, if motion information about the reference point Pa2 has a format of a motion vector indicated by a value ua of the X coordinate and a value va of the Y coordinate, a value of the X coordinate of the reference point Pa2 is Xa1+ua obtained by adding the value ua of the X coordinate of the motion information to a value Xa1 of the X coordinate of the reference point Pa1, and a value of the Y coordinate of the reference point Pa2 is Ya1+va obtained by adding the value va of the Y coordinate of the motion information to a value Ya1 of the Y coordinate of the reference point Pa1.

As shown in FIG. 30, in the searching portion 422B, a corresponding point Pb2 corresponding to a corresponding point Pd1 of the D picture Md1 in a P picture Mb2 to be a next frame of the D picture Md1 is derived based on motion information included in the P picture Mb2 for the second compressed dynamic image Mbb. For example, if motion information about the corresponding point Pb2 has a format of a motion vector indicated by a value ub of the X coordinate and a value vb of the Y coordinate, a value of the X coordinate of the corresponding point Pb2 is Xd1+ub obtained by adding the value ub of the X coordinate of the motion information to a value Xd1 of the X coordinate of the corresponding point Pd1, and a value of the Y coordinate of the corresponding point Pb2 is Yd1+vb obtained by adding the value vb of the Y coordinate of the motion information to a value Yd1 of the Y coordinate of the corresponding point Pd1.

In the computing portion 42, in the case in which a next set of frames of a certain set of P pictures is a set of P pictures, a P detection processing related to the set of P pictures in the next frames is carried out based on a result of a detection in the P detection processing intended for the certain set of P pictures and motion information included in the set of P pictures in the next frames.

In other words, in the case in which the set of P pictures continues in the first compressed dynamic image Maa and the second compressed dynamic image Mbb, the P detection processing related to each set of P pictures is carried out based on a result of a detection in an I detection processing intended for a last set in the set of I pictures and the set of I and D pictures and motion information from the last set to the certain set of P pictures intended for the P detection processing. In other words, the P detection processing intended for each set of P pictures is carried out based on the result of the detection in the I detection processing intended for the set of I pictures or the set of I and D pictures and the motion information included in the P picture.

In an operation flow of the information processing system 1B according to the present embodiment, the Step S65 in FIG. 24 is replaced with Step SB65 in which the content of the P detection processing is changed based on the operation flow of the information processing system 1 according to the first embodiment so that the Step S6 shown in FIG. 22 is replaced with Step SB6 in which the content of the corresponding point detection processing is changed. The present operation flow is implemented by reading and executing a program PGB in the storage portion 404 through the control portion 406.

As described above, in the information processing system 1B according to the third embodiment, the corresponding point is detected for the set of P pictures based on the result of the I detection processing and the motion information possessed by the P pictures. Therefore, a necessary computation for the P detection processing is reduced remarkably so that a computation required for the detection of the corresponding point related to the P picture is decreased considerably.

<(4) Fourth Embodiment>

In the information processing system 1B according to the third embodiment, referring to the set of P pictures, the reference point and the corresponding point which corresponds to the reference point are indirectly obtained based on the result of the detection in the I detection processing and the motion information. On the other hand, in an information processing system 1C according to a fourth embodiment, a reliability of a corresponding relationship is decided for a reference point and a corresponding point which are obtained indirectly. Consequently, it is possible to take a countermeasure against a corresponding point having a low reliability. Description will be given to different respects in the information processing system 1C according to the fourth embodiment from the information processing system 1B according to the third embodiment.

<(4-1) Functional Configuration of Information Processing System>

FIG. 31 is a diagram showing a functional configuration of the information processing system 1C.

In the information processing system 1C, the computing portion 42B is changed into a computing portion 42C in which an evaluation value calculating portion 424 and a reliability deciding portion 425 are added, and furthermore, the distance measuring portion 423 is replaced with a distance measuring portion 423C based on the information processing system 1B according to the third embodiment.

The evaluation value calculating portion 424 calculates a value (which will also be referred to as an evaluation value) for evaluating a similarity between the reference point and the corresponding point for a set of the reference point and the corresponding point which is obtained for the set of P pictures in the P detection processing through the searching portion 422B. The similarity is a degree of coincidence and represents a possibility that the same subject portion might be captured.

It is sufficient that the evaluation value is a value indicative of a correlation related to a corresponding point in a distribution indicative of a correlation between a region R1 including the reference point as a center in one of the P pictures (which will also be referred to as one evaluation region) and a region R2 including the corresponding point as a center in the other P picture (which will also be referred to as the other evaluation region) as shown in FIG. 32, for example. It is sufficient that the value indicative of the correlation should is obtained from a distribution of a POC value calculated by the similar processing using a POC method as the P detection processing, for example. It is sufficient that the one evaluation region R1 and the other evaluation region R2 are regions taking the same size and shape (herein, a square).

The reliability deciding portion 425 decides a reliability related to a set of the reference point and the corresponding point which are calculation targets for an evaluation value by a comparison between an evaluation value calculated by the evaluation value calculating portion 424 and a preset threshold. The reliability indicates a likelihood for the corresponding point with respect to the reference point. For example, it is possible to propose a manner in which the reliability related to the set of the reference point and the corresponding point is decided to be high if the evaluation value is equal to or greater than the threshold, and the reliability related to the set of the reference point and the corresponding point is decided to be low if the evaluation value is smaller than the threshold. It is sufficient that the threshold is prestored in the storage portion 404, for example.

The distance measuring portion 423C derives the distance D from the stereo camera 2 to the subject based on a parallax $\Delta d$ obtained from the coordinates of the reference point and the corresponding point depending on a result of the decision acquired by the reliability deciding portion 425. More specifically, for example, it is possible to propose a manner in which the distance D is not calculated for each set of the reference point and the corresponding point which are decided to have a low reliability by the reliability deciding portion 425 and the distance D is calculated for each set of the reference point and the corresponding point which are decided to have a high reliability by the reliability deciding portion 425. Consequently, it is possible to implement a reduction in a computation and a maintenance of precision in the calculation of the distance D. It is sufficient that a method of deriving the distance D is the same as the deriving method in the distance measuring portion 423 according to the first to third embodiments, for example.

<(4-2) Operation of Information Processing System>

Figure 33:
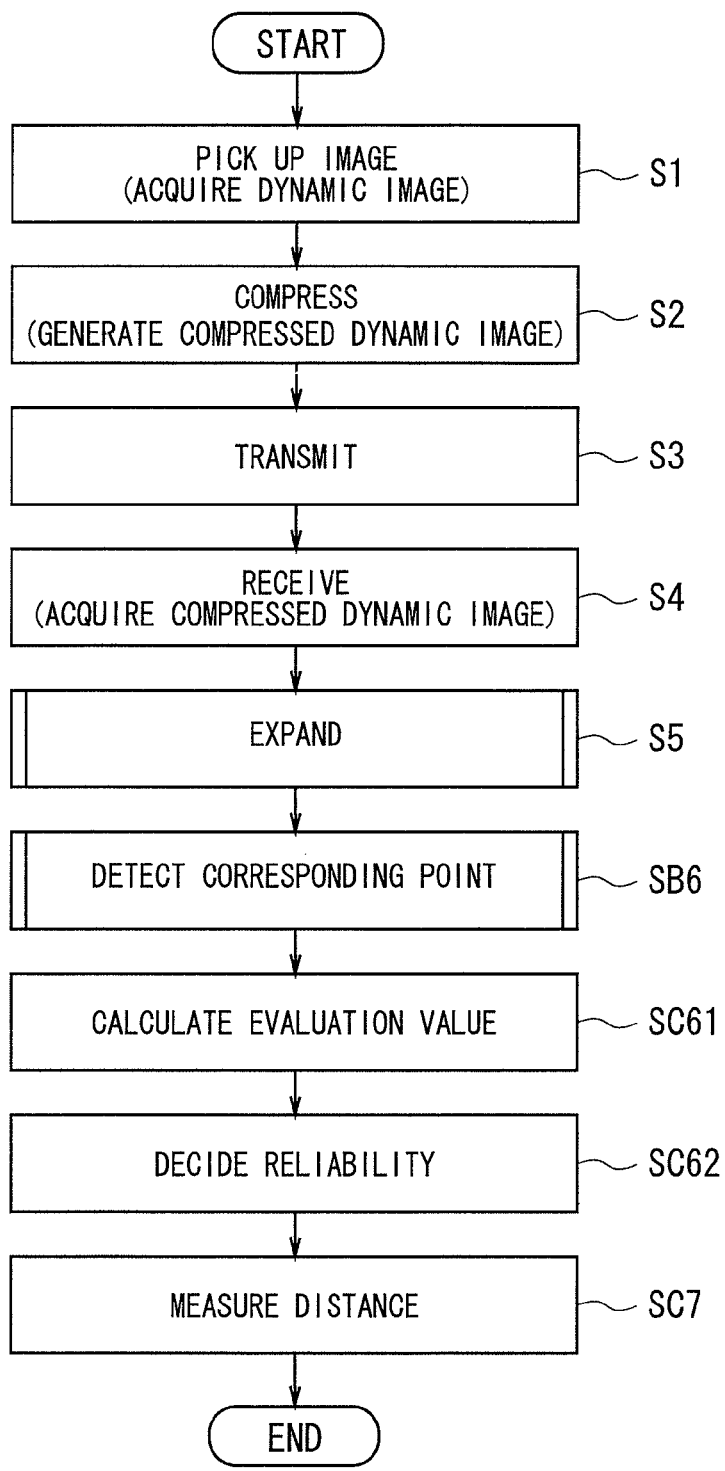
FIG. 33 is a flow chart showing an operation flow of the information processing system.

FIG. 33 is a flow chart showing an operation flow in the information processing system 1C. The present operation flow is implemented by reading and executing a program PGC in the storage portion 404 through the control portion 406. In the present operation flow, first of all, the same processings as the Steps S1 to S5 and SB6 according to the third embodiment shown in FIG. 22 are executed and the processings of Steps SC61, SC62 and SC7 are then executed in order.

At the Step SC61, an evaluation value is calculated for each set of a reference point and a corresponding point which is obtained in the P detection processing of the Step SB6 by the evaluation value calculating portion 424.

At the Step SC62, the evaluation value calculated at the Step SC61 and the threshold are compared with each other and a reliability is decided for each set of the reference point and the corresponding point which is obtained in the P detection processing of the Step SB6 by the reliability deciding portion 425.

At the Step SC7, the distance D from the stereo camera 2 to the subject is derived depending on a result of the decision in the Step SC62 for each set of the reference point and the corresponding point which is obtained in the P detection processing of the Step SB6 by the distance measuring portion 423C. For example, the distance D is not derived for each set of a reference point and a corresponding point in which a reliability is lower than a threshold, and the distance D is derived for each set of a reference point and a corresponding point in which the reliability is equal to or higher than the threshold.

<(4-3) Conclusion of Fourth Embodiment>

As described above, in the information processing system 1C according to the fourth embodiment, the reliability is decided for each set of the reference point and the corresponding point which is obtained in the P detection processing. Therefore, a countermeasure can be taken against a corresponding point having a low reliability.

<(5) Fifth Embodiment>

In the information processing system 1B according to the third embodiment, the reference point and the corresponding point which corresponds to the reference point are indirectly obtained based on the result of the detection in the I detection processing and the motion information for the set of P pictures. On the other hand, in an information processing system 1D according to a fifth embodiment, the corresponding point obtained indirectly is set to be a temporary corresponding point (which will also be referred to as a temporary corresponding point) and a processing for detecting a corresponding point intended for the set of P pictures is executed by setting the temporary corresponding point as a processing target point. By the P detection processing having processings in two stages, it is possible to reduce a computation related to a detection of a corresponding point while suppressing a decrease in precision in the detection of the corresponding point. Description will be given to different respects in the information processing system 1D according to the fifth embodiment from the information processing system 1B according to the third embodiment.

<(5-1) Functional Configuration of Information Processing System>

Figure 34:
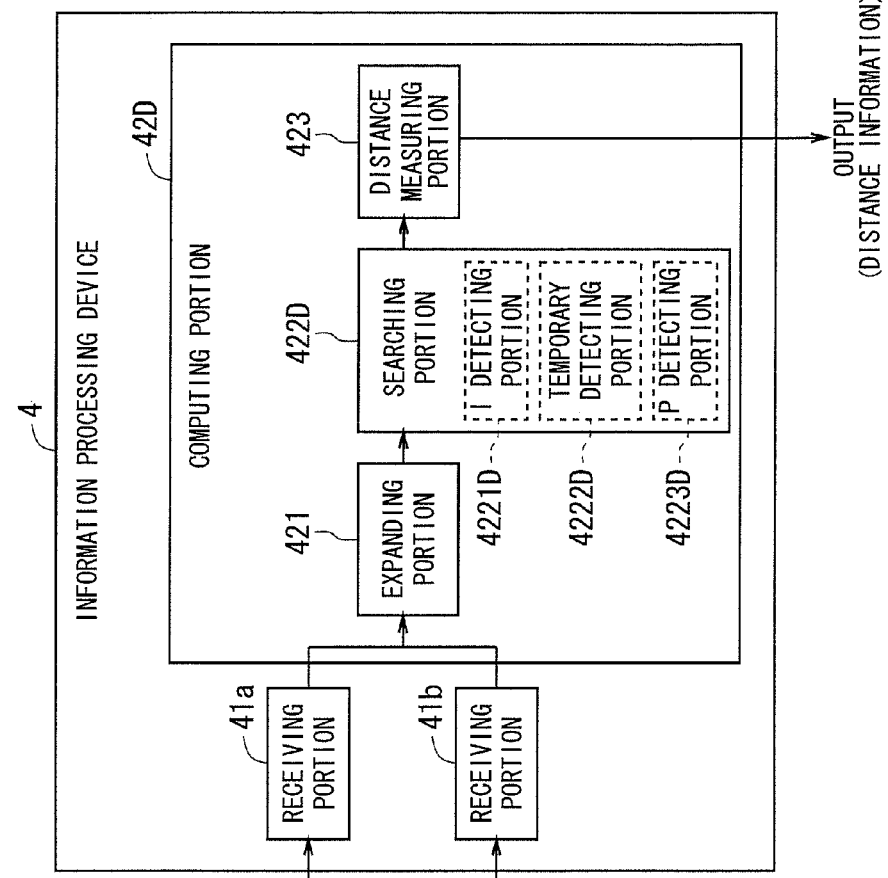
FIG. 34 is a diagram showing a functional configuration of an information processing system according to a fifth embodiment.

FIG. 34 is a diagram showing a functional configuration of the information processing system 1D.

In the information processing system 1D, the computing portion 42B is changed into a computing portion 42D in which the searching portion 422B is replaced with a searching portion 422D based on the information processing system 1B according to the third embodiment.

The searching portion 422D includes an I detecting portion 4221D, a temporary detecting portion 4222D and a P detecting portion 4223D.

The I detecting portion 4221D executes the same processing as the I detection processing according to the third embodiment.

The temporary detecting portion 4222D to be a first detecting portion obtains a corresponding point which corresponds to a reference point included in one of P pictures from the other P picture for a set of P pictures by the same processing as the P detection processing according to the third embodiment. In other words, a set of P pictures is set to be a target and a temporary corresponding point which corresponds to each reference point on the one of the P pictures is obtained from the other P picture based on a result of a detection in the I detection processing intended for a set of I pictures or a set of I and D pictures and motion information included in the set of P pictures.

The P detecting portion 4223D to be a second detecting portion detects a corresponding point which corresponds to a reference point of one of the P pictures from the other P picture by comparing a region (which will also be referred to as a reference region) including a reference point contained in one of the P pictures and a region (which will also be referred to as a comparison region) including a temporary corresponding point contained in the other P picture with respect to a set of P pictures being target.

Figure 35:
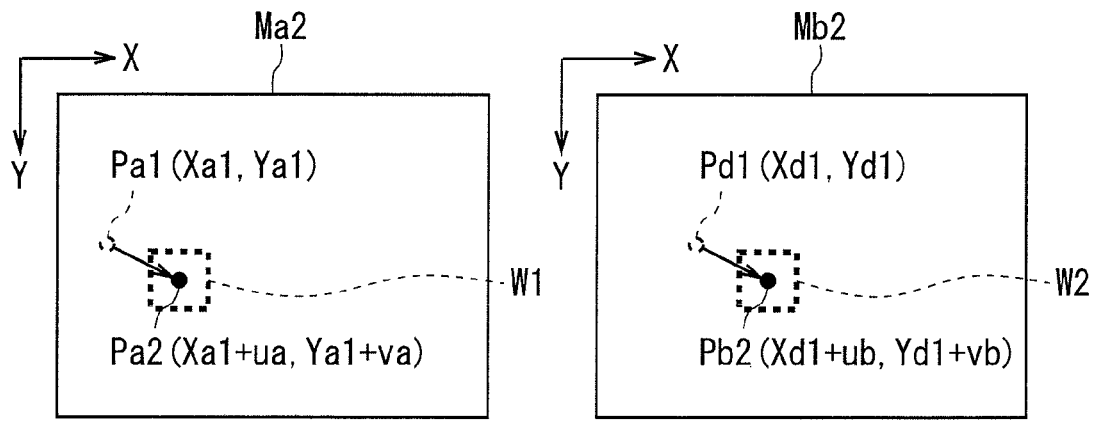
FIG. 35 is a diagram for explaining a principle of a P detection processing according to the fifth embodiment.

More specifically, for example, a reference region W1 including a reference point (for example, a reference point Pa2) as a center is set to one of the P pictures (for example, a P picture Ma2) and a comparison region W2 including a temporary corresponding point (for example, a temporary corresponding point Pb2) as a center is set to the other P picture (for example, a P picture Mb2) as shown in FIG. 35. By the same method as a method of obtaining a distribution of a correlation value between the reference region Wa and the comparison region Wb in the P detection processing according to the first embodiment, then, the distribution of the correlation value between the reference region W1 and the comparison region W2 is obtained so that a point which corresponds to a maximum correlation value in the distribution is detected as a corresponding point.

<(5-2) Operation of Information Processing System>

Figure 36:
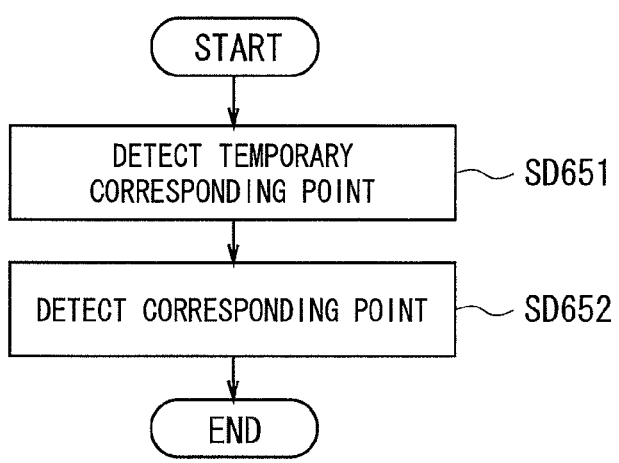
FIG. 36 is a flow chart showing an operation flow of the information processing system.

In the operation flow in the information processing system 1D, the Step SB65 (FIG. 24) of the operation flow according to the third embodiment is replaced with Step SD65 in which an operation flow shown in FIG. 36 is to be executed so that the Step SB6 (FIG. 22) is replaced with Step SD6 having a processing content changed. The present operation flow is implemented by reading and executing a program PGD in a storage portion 404 through a control portion 406. Description will be given to the Step SD65 which is different from the operation flow according to the third embodiment.

When the operation flow makes a transition to the Step SD65, processings of Steps SD651 and SD652 shown in FIG. 36 are executed in order.

At the Step SD651, referring to a set of P pictures, a corresponding point which corresponds to a reference point included in one of P pictures is detected from the other P picture by the temporary detecting portion 4222D.

At the Step SD652, a corresponding point which corresponds to a reference point of one of the P pictures is detected from the other P picture by a comparison of a reference region including, as a center, a reference point contained in the one of the P pictures and a comparison region including a temporary corresponding point contained in the other P picture detected at the Step SD651 for a set of P pictures by the P detecting portion 4223D.

<(5-3) Conclusion of Fifth Embodiment>

As described above, in the information processing system 1D according to the fifth embodiment, the temporary corresponding point obtained by the I detection processing and the motion information is used in the P detection processing. Even if a corresponding point between frames having resolutions in a multistage is not detected, consequently, the corresponding point can easily be detected. Therefore, it is possible to reduce a computation related to the detection of the corresponding point while suppressing a decrease in precision in the detection of the corresponding point.

<(6) Variant>

The present invention is not restricted to the embodiments but various changes, improvements and the like can be made without departing from the gist of the present invention. First to fourth variants will be described below in order and the other variants will subsequently be explained.

<(6-1) First Variant>

In the moving picture compression to be executed in the compressing portions 22a and 22b, information about a frequency in a predetermined band (mainly a high frequency band) is deleted as described above. In other words, each I picture is a frame subjected to a compression processing for deleting the information about the frequency in the predetermined band. In the I detection processing to be executed in the computing portions 42 and 42A to 42D according to the first to fifth embodiments, therefore, it is also possible to carry out a calculation using the POC method which disregards the predetermined band. In the calculation using the POC method which disregards the predetermined band, such weighting as to reduce a frequency component more greatly than in a residual band is carried out over the predetermined band.

Figure 37:
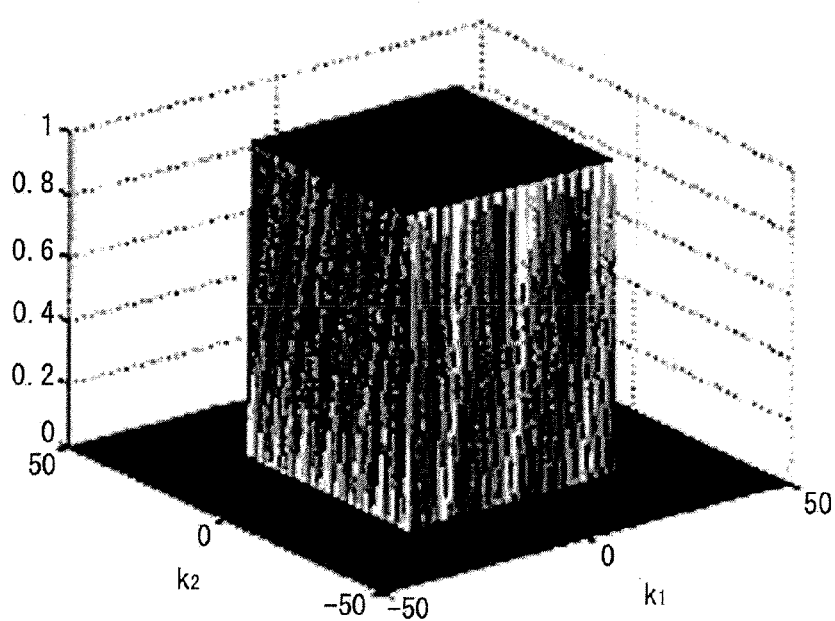
FIG. 37 is a chart illustrating a distribution of a weighting factor according to a first variant.
Figure 38:
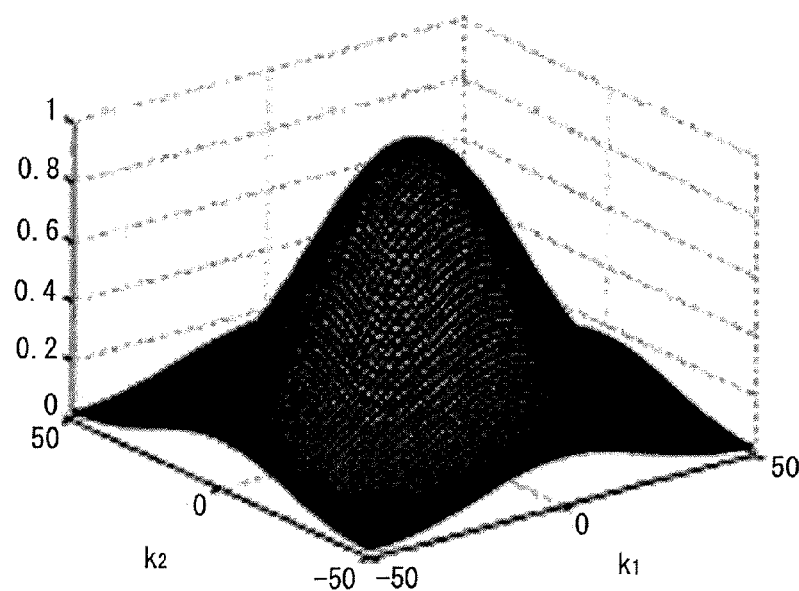
FIG. 38 is a chart illustrating the distribution of the weighting factor according to the first variant.

For example, in the POC method, it is possible to propose a manner in which a value subjected to the synthesis processing T4 is multiplied by a weighing factor set to each frequency after the execution of the synthesis processing T4 and before the execution of the two-dimensional inverse Fourier transform processing T5 so that a processing for limiting a predetermined frequency component (which will also be referred to as a band limitation processing) is carried out. For the weighting factor, it is also possible to employ a weighting factor which is distributed into a rectangular shape for perfectly cutting a component related to a high frequency as shown in FIG. 37 or to employ a weighting factor which is distributed into a Gaussian shape as shown in FIG. 38. By the band limitation processing, there is reduced the influence of so-called aliasing generated in relation to a high frequency component or the like.

It is sufficient that the frequency disregarded in the band limitation processing is set depending on information about a frequency to be deleted in the moving picture compression which is executed by the compressing portions 22a and 22b. In other words, it is sufficient that the frequency disregarded in the band limitation processing is set depending on a compression ratio in the moving picture compression.

By carrying out the band control processing described above, it is also possible to reduce a computation related to a frequency in a predetermined band in an I detection processing. Therefore, an unnecessary calculation is reduced so that a computation related to a detection of a corresponding point is decreased. By reducing the influence of the so-called aliasing or the like, it is possible to enhance precision in the detection of the corresponding point in the I detection processing. Referring to the P detection processing, similarly, it is possible to obtain the same function and effect as that in the I detection processing by executing the same band limitation processing as the I detection processing.

<(6-2) Second Variant>

In the moving picture compression to be executed by the compressing portions 22a and 22b, the DCT and the quantization is carried out in a block unit having a predetermined size as described above. For this reason, a so-called block noise is present in each frame subjected to the moving picture compression. In respect of a suppression in a reduction of precision in a detection of a corresponding point due to the influence of the block noise, therefore, it is preferable that the reference region Wa and the comparison region Wb which are set to each frame in an I detection processing and a P detection processing should be set as regions adapted to the block.

Figure 39:
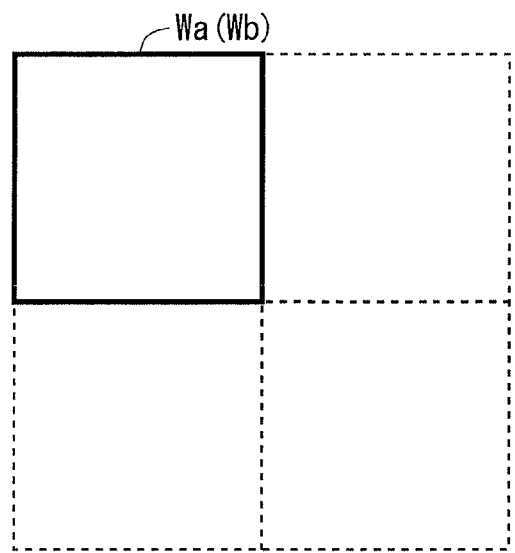
FIG. 39 is a schematic diagram showing an example in which a window is set according to a second variant.
Figure 40:
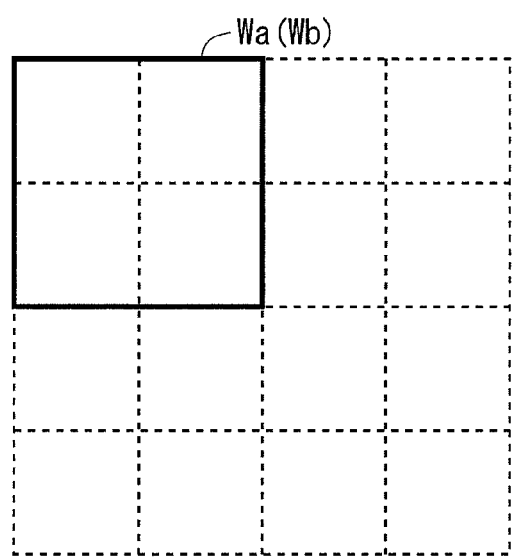
FIG. 40 is a schematic diagram showing an example in which the window is set according to the second variant.

FIGS. 39 and 40 are diagrams illustrating a manner for setting the reference region Wa and the comparison region Wb which are adapted to the block. In FIGS. 39 and 40, each square region surrounded by a broken line corresponds to the block in each frame. As shown in FIG. 39, if the reference region Wa and the comparison region Wb are set to be coincident with a region corresponding to a single block, the reference region Wa and the comparison region Wb do not cross a boundary line between the blocks. For this reason, it is possible to remarkably suppress a reduction in the precision in the detection of the corresponding point. However, a central point of the reference region Wa is set to be a reference point. Therefore, the reference point is sequentially set into a discrete position of each frame.

In the case in which each block has a small size, the boundary line between the blocks included in the reference region Wa and the comparison region Wb is lessened if the reference region Wa and the comparison region Wb are set to be coincident with a region corresponding to a block group formed by a plurality of (for example, four) blocks as shown in FIG. 40. Therefore, the reduction in the precision in the detection of the corresponding point is suppressed.

Referring to a set of frames having a resolution reduced in a plurality of stages, particularly, a region corresponding to a single block is small. As shown in FIG. 40, therefore, it is suitable to employ a manner in which reference regions $Wa_{S1}$ to $Wa_{S3}$ and comparison regions $Wb_{S1}$ to $Wb_{S3}$ are set in adaptation to each region corresponding to the block group. In other words, it is sufficient that an outer edge of the block is adapted to outer edges of the reference region Wa and the comparison region Wb.

Referring to the manner in which the reference regions Wa and $Wa_{S1}$ to $Wa_{S3}$ and the comparison regions Wb and $Wb_{S1}$ to $Wb_{S3}$ are set in adaptation to the block, there is a tendency that the reference point is discretely set and the comparison regions Wb and $Wb_{S1}$ to $Wb_{S3}$ including a processing target point as a point provided slightly out of a center are set.

In the case of a manner in which the reference regions Wa and $Wa_{S1}$ to $Wa_{S3}$ and the comparison regions Wb and $Wb_{S1}$ to $Wb_{S3}$ are set in adaptation to the region corresponding to the block group as shown in FIG. 40, however, it is possible to set the reference point into a position other than the center of the block and to cause the processing target point to be present closer to the center of the comparison regions Wb and $Wb_{S1}$ to $Wb_{S3}$.

<(6-3) Third Variant>

Although the temporary corresponding point is indirectly obtained based on the motion information, and the temporary corresponding point is set to be the processing target point and the processing for detecting the corresponding point intended for the set of P pictures is carried out in the information processing system 1D according to the fifth embodiment, the present invention is not restricted thereto.

For example, when the motion information is used to indirectly obtain the temporary corresponding point, the set of P pictures may be expanded into the set of D pictures and the set of D pictures may be set into a target to detect a corresponding point with the temporary corresponding point acting as a reference. In such a manner, referring to the set of D pictures, a complicated processing for generating a frame having a resolution in a multistage to detect a corresponding point is not required, and furthermore, the precision in the detection of the corresponding point is maintained. In other words, it is possible to reduce a computation related to the detection of the corresponding point while suppressing a reduction in precision in the detection of the corresponding point by the P detection processing having the processing in two stages. Description will be given to different respects in an information processing system 1E according to a third variant from the information processing system 1D according to the fifth embodiment.

FIG. 41 is a diagram showing a functional configuration of the information processing system 1E.

In the information processing system 1E, the computing potion 42D is changed into a computing portion 42E in which the searching portion 422D is replaced with a searching portion 422E and an expanding portion 426E is added based on the information processing system 1D according to the fifth embodiment. In the searching portion 422E, the P detecting portion 4223D is replaced with an I detecting portion 4223E based on the searching portion 422D according to the fifth embodiment.

The expanding portion 426E expands one of P pictures in the set of P pictures to generate a frame subjected to the expansion (that is, a D picture), and furthermore, expands the other P picture to generate a frame subjected to the expansion (that is, the D picture).

The I detecting portion 4223 E serving as a second detecting portion is intended for a set of D pictures and detects a corresponding point corresponding to a reference point of one of the D pictures from the other D picture by a comparison of a region including the reference point contained in the one of the D pictures (which will also be referred to as a reference region) and a region including a temporary corresponding point (that is, a processing reference point) included in the other D picture (which will also be referred to as a comparison region). More specifically, it is possible to propose a manner in which the distribution of the correlation value between the reference region and the comparison region is obtained by the same method as the method of obtaining the distribution of the correlation value between the reference region Wa and the comparison region Wb through the I detection processing according to the first embodiment, and a point which corresponds to a maximum correlation value in the distribution is detected as a corresponding point.

In the operation flow in the information processing system 1E, the Step SD65 (FIG. 24) is replaced with Step SE65 in which an operation flow show in FIG. 42 is executed so that the Step SD6 (FIG. 22) is replaced with Step SE6 having a processing content changed based on the operation flow according to the fifth embodiment. The present operation flow is implemented by reading and executing a program PGE in a storage portion 404 through a control portion 406. Description will be given to the Step SE65 which is different from the operation flow according to the fifth embodiment.

When the present operation flow makes a transition to the Step SE65, processings of Steps SE651 to SE653 shown in FIG. 42 are executed in order.

At the Step SE651, in the same manner the Step SD651 according to the fifth embodiment, a set of P pictures is intended and a corresponding point which corresponds to a reference point contained in one of P pictures is detected from the other P picture by the temporary detecting portion 4222D.

At the Step SE652, one of the P pictures in the set is expanded so that one of D pictures is generated, and furthermore, the other P picture is expanded so that the other D picture is generated by the expanding portion 426E. Consequently, a set of D pictures is generated.

At the Step SE653, the set of D pictures generated at the Step SE652 is intended and a corresponding point which corresponds to a reference point of the one of the D pictures is detected from the other D picture by a comparison of a reference region including the reference point on the one of the D pictures and a comparison region including a temporary corresponding point (that is, a processing reference point) on the other D picture detected at the Step SE651.

<(6-4) Fourth Variant>

In the first to fifth embodiments, referring to the set of I and P pictures, the P picture is expanded into the D picture, and furthermore, the I detection processing intended for the set of I and D pictures is carried out. However, the present invention is not restricted thereto. For example, referring to the set of I and P pictures, the I picture may be converted into the P picture through the moving picture compression, and furthermore, the P detection processing intended for the set of P pictures may be carried out. In other words, referring to the set of I and P pictures, it is sufficient that a conversion of a data format of a frame can be carried out to be adapted to a data format of either the I picture or the P picture. Referring to a set of frames having a different configuration, consequently, it is also possible to detect a corresponding point.

Figure 43:
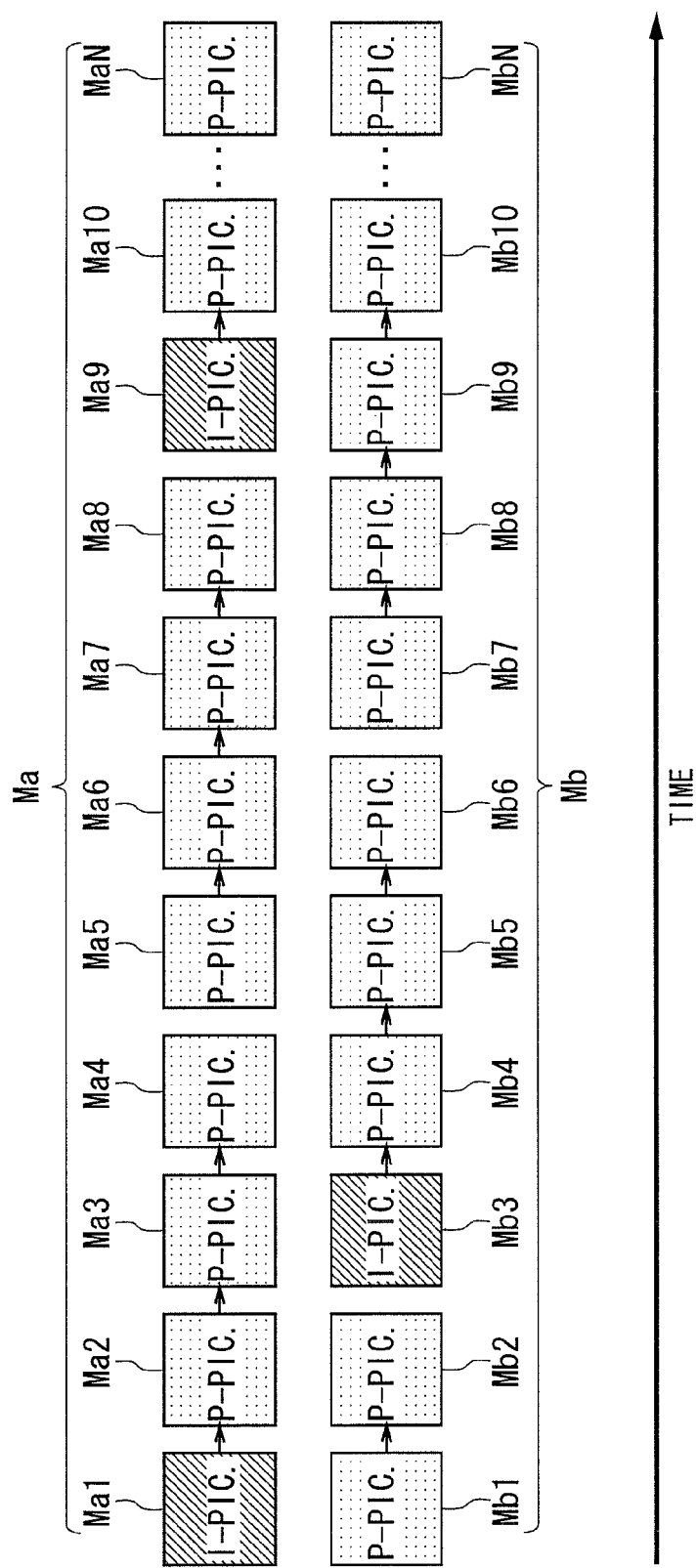
FIG. 43 is a diagram for explaining a principle of a processing for detecting a corresponding point according to a fourth variant.
Figure 44:
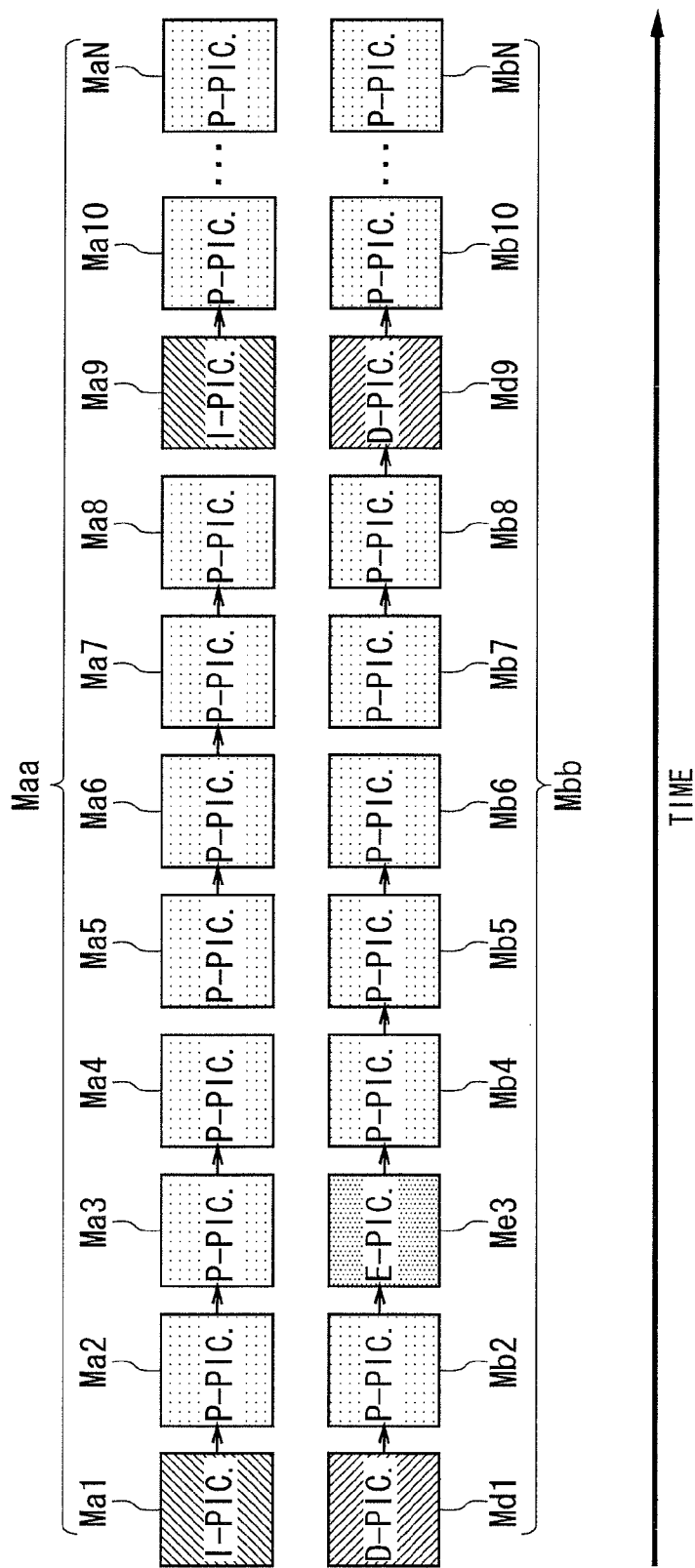
FIG. 44 is a diagram for explaining the principle of the processing for detecting a corresponding point according to the fourth variant.

FIGS. 43 and 44 are diagrams showing a manner in which each frame of the second compressed dynamic image Ma is converted if necessary so as to be adapted to a data format of each frame of the first compressed dynamic image Ma.

In the case in which first, third and ninth sets of frames are equivalent to the set of I and P pictures as shown in FIG. 43, the first compressed dynamic image Ma is exactly treated as the first compressed dynamic image Maa as shown in FIG. 44. Referring to the second compressed dynamic image Mb, the data formats of the first, third and ninth frames Mb1, Mb3 and Mb9 are converted so that the second compressed dynamic image Mbb is generated. More specifically, referring to the first and ninth frames Mb1 and Mb9, the P picture is expanded and converted into the D pictures Md1 and Md9. On the other hand, referring to the third frame Mb3, the I picture is compressed so that the frame (which will also be referred to as an E picture) Me3 indicated by motion information in the same manner as the P picture is generated. In this case, referring to the set of the P picture Ma3 and the E picture Me3, it is sufficient that the P detection processing is carried out.

Referring to the E picture Me3, for example, it is sufficient that a last P picture Mb2 is expanded into a D picture and the E picture Me3 having each pixel shown in motion information obtained by a comparison of the D picture and the I picture Mb3 is generated. In consideration of the influence of an increase in a computation required for generating the E picture, it is preferable that the processing according to the present variant should be employed in the case in which a rate of an occupancy of the I picture is low in a large number of frames constituting each compressed dynamic image, and a frequency for generating the E picture is low, for example.

<(6-5) Other Variant>

For example, although the distance D is not obtained for each set of the reference point and the corresponding point which are decided to have a low reliability by the reliability deciding portion 425 in the fourth embodiment, the present invention is not restricted thereto. For example, the other processings may be carried out, depending on a result of the decision acquired by the reliability deciding portion 425. Examples of the other processings include a processing for attaching a flag indicative of a low reliability for the distance D obtained for each set of the reference point and the corresponding point which are decided to have a low reliability through the distance measuring portion 423C, and the like.

Referring to each set of the reference point and the corresponding point which are decided to have a low reliability, moreover, the set of the reference point and the corresponding point may be a set of the reference point and a processing target point to carry out a further detection processing of a corresponding point through the searching portion 422B. Examples of the further detection processing of the corresponding point include a processing for obtaining a distribution of a correlation value between the reference region Wa including the reference point as a center in one of the P pictures and the comparison region Wb including a processing target point as a center in the other P picture and detecting a point which corresponds to a maximum correlation value as a corresponding point in the distribution by the same method as the P detection processing.

Referring to each set of the reference point and the corresponding point which are decided to have a low reliability, moreover, one of the P pictures and the other P picture may be expanded into a set of D pictures and the I detection processing intended for the set of D pictures may be carried out to detect the corresponding point.

As described above, if the reliability related to the corresponding point is decided, various countermeasures can be taken against the corresponding point having a low reliability.

Although the P picture is employed as the prediction frame in the first to fifth embodiments and the first to fourth variants, the present invention is not restricted thereto. For example, any of the P pictures and the B pictures may be employed as the prediction frame.

Although the distance D from the stereo camera 2 to the subject is obtained in the first to fifth embodiments and the first to fourth variants, the present invention is not restricted thereto. For example, it is also possible to artificially generate an image of a subject which is predicted to be obtained if an image is picked up from a different viewpoint from the viewpoint of the stereo camera 2 based on the distance D related to each pixel of the stereo image and luminance information about the each pixel.

Although the I detection processing uses the POC method in the first to fifth embodiments and the third and fourth variants, the present invention is not restricted thereto. For example, a so-called SAD method may be employed. In the third variant, if the so-called SAD method is employed, a corresponding point is detected with a temporary corresponding point set to be a reference in the I detection processing intended for the set of D pictures.

In the first to fifth embodiments and the first to fourth variants, each combination of the reference point and the corresponding point is detected for a stereo dynamic image. The result of the detection may be stored in the storage portion 404 in a multiview video coding (MVC) format. Consequently, a versatility of information to be acquired can be enhanced. The MVC is issued as Annex H of ITU-T recommended H.264 or ISO/IEC standard MPEG4 AVC (legal name: ISO/IEC 14496-10). In the MVC, an image related to a single viewpoint is set to be a base image, and images related to other viewpoints are expressed in parallax information about the base image. Each image is subjected to a compression through a motion compensation.

Although the corresponding point which corresponds to the reference point between two compressed dynamic images, that is, the first and second compressed dynamic images is detected in the first to fifth embodiments and the first to fourth variants, the present invention is not restricted thereto. For example, the corresponding point which corresponds to the reference point may be detected among three compressed dynamic images or more. In other words, the corresponding point which corresponds to the reference point may be detected between a plurality of compressed dynamic images.

Although the first and second compressing portions 22a and 22b are separately present in the first to fifth embodiments and the first to fourth variants, the present invention is not restricted thereto but a single compressing portion may be provided.

Although the I detection processing intended for the set of I pictures and the set of I and D pictures is carried out in the first to fifth embodiments and the first to fourth variants, the present invention is not restricted thereto. For example, if the rate of the occupancy of the P picture in each compressed dynamic image is high, at least one set of P pictures may be expanded into a set of D pictures and the I detection processing intended for each set of D pictures may be carried out.

It is apparent that all or partial portions constituting the embodiments and the variants respectively can be combined properly within a consistent range.

EXPLANATION OF SIGNS

1, 1A to 1E information processing system
4 information processing device
21a, 21b image pickup portion
22a, 22b compressing portion
23a, 23b transmitting portion
41a, 41b receiving portion
42, 42A to 42E computing portion
404 storage portion
406 control portion
421, 426E expanding portion
422, 422A, 422B, 422D, 422E searching portion
424 evaluation value calculating portion
425 reliability deciding portion
4221D, 4223E I detecting portion
4222D temporary detecting portion 4223 D P detecting portion
PG, PGA to PGE program

The invention claimed is:

1. An image processing system comprising:
an acquiring portion for acquiring first and second compressed dynamic images, wherein said first and second compressed dynamic images each comprises a plurality of frames, including a reference frame and a prediction frame, wherein each pixel of said prediction frames is indicated by motion information based on a corresponding frame of a respective compressed dynamic image; and
a computing portion for carrying out a detection processing with respect to a plurality of sets of frames each set of frames comprising 1) a frame in said first compressed dynamic image and 2) a frame in said second compressed dynamic image corresponding thereto for detecting a corresponding point for each reference point contained in one frame of said first compressed dynamic image, wherein said detected corresponding point is contained in a frame of said second compressed dynamic image, wherein said detected corresponding point is detected by causing each of said plurality of sets of frame to be a target,
said computing portion executing said detection processing for a set of prediction frames contained in said plurality of sets of frames by using motion information indicative of said set of said prediction frames.

2. The image processing system according to claim 1, wherein said computing portion executes said detection processing for said set of said prediction frames based on a result of a detection obtained by executing said detection processing for a set of reference frames in said plurality of sets of frames, and motion information indicative of said set of said prediction frames.

3. The image processing system according to claim 2, further comprising:
a calculating portion for calculating an evaluation value related to a similarity between one reference point contained in one prediction frame of said set of said prediction frames and one corresponding point contained in one prediction frame of said set of said prediction frames, said one corresponding point being detected with respect to said one reference point in said detection processing related to said set of said prediction frames; and
a deciding portion for deciding a reliability related to said one corresponding point by a comparison of said evaluation value and a preset threshold.

4. The image processing system according to claim 1, wherein said computing portion comprises:
a first detecting portion for detecting one temporary corresponding point contained in one prediction frame of said second compressed dynamic image in said set of said prediction frames, which corresponds to one reference point contained in one prediction frame of said first compressed dynamic image in said set of said prediction frames, wherein said one temporary corresponding point is based on a result of a detection obtained by executing said detection processing for a set of reference frames in said plurality of sets of frames and motion information indicative of said set of said prediction frames; and
a second detecting portion for detecting one corresponding point, corresponding to said one reference point from said one prediction frame of said second compressed dynamic image in said set of said prediction frames by a comparison of a region including said one reference point in said one prediction frame of said first compressed dynamic image in said set of said prediction frames and a region including said one temporary corresponding point in said one prediction frame of said second compressed dynamic image in said set of said prediction frames.

5. The image processing system according to claim 1, wherein said computing portion includes:
a first detecting portion for detecting one temporary corresponding point contained in one prediction frame of said second compressed dynamic image in said set of said prediction frames, which corresponds to one reference point contained in one prediction frame of said first compressed dynamic image in said set of said prediction frames, wherein said one temporary corresponding point is based on a result of a detection obtained by executing said detection processing for a set of reference frames in said plurality of sets of frames and motion information indicative of said set of said prediction frames;
an expanding portion for expanding said one prediction frame of said first compressed dynamic image in said set of said prediction frames to generate an expanded frame of said one prediction frame of said first compressed dynamic image in said set of said prediction frames and expanding said one prediction frame of said second compressed dynamic image in said set of said prediction frames to generate an expanded frame of said one prediction frame of said second compressed dynamic image in said set of said prediction frames; and
a second detecting portion for detecting one corresponding point which corresponds to said one reference point, from said expanded frame of said one prediction frame of second compressed dynamic image in said set of said prediction frames based on a region including said one temporary corresponding point in said expanded frame of said one prediction frame of second compressed dynamic image in said set of said prediction frames.

6. The image processing system according to claim 1, wherein each reference frame of said first and second compressed dynamic images is a frame subjected to a compression processing for deleting information about a frequency in a predetermined band, and
said computing portion executes a calculation using a phase only correlation method while carrying out weighting for reducing a frequency component for said predetermined band more greatly than a residual band, thereby carrying out said detection processing for a set of frames.

7. The image processing system according to claim 1, wherein each reference frame of said first and second compressed dynamic images is a frame subjected to a compression processing in a block unit having a predetermined size, and
said computing portion sets a first region to a portion of a first frame of said first compressed dynamic image including one reference point and having a size identical to said block unit, sets a second region to a portion of a second frame of said second compressed dynamic image having a size identical to said block unit, and carries out a calculation using a phase only correlation method for said first region and said second region, thereby executing said detection processing for a set of said first frame and said second frame.

8. The image processing system according to claim 1, wherein a set of frames in said plurality of sets of frames comprises a reference frame and a prediction frame, and said computing portion converts to a format of one frame of said set of frames in said plurality of sets of frames to conform to a format of the other frame of said set of frames in said plurality of sets of frames, and thereafter executes said detection processing with respect to said converted one frame and said other frame.

9. The image processing system according to claim 8, wherein said one frame of said set of frames in said plurality of frames is a prediction frame and said other frame of said set of frames in said plurality of sets of frames is a reference frame, and said computing portion converts said one frame of said set of frames in said plurality of frames by expanding said one frame of said set of frames in said plurality of frames.

10. The image processing system according to claim 1, wherein said set of prediction frames includes a first prediction frame and a second prediction frame, and
    said computing portion detects one corresponding point, which corresponds to one reference point, from said second prediction frame by a comparison of motion information related to a reference region including said one reference point in said first prediction frame and motion information related to a comparison region including one temporary corresponding point in said second prediction frame.

11. The image processing system according to claim 10, wherein said motion information related to said reference region includes one two-dimensional reference distribution of motion information about one direction and another two-dimensional reference distribution of motion information about another direction which is different from said one direction,
    said motion information related to said comparison region includes one two-dimensional comparison distribution of motion information about said one direction and another other two-dimensional comparison distribution of motion information related to said another direction, and
    said computing portion detects said one corresponding point which corresponds to said one reference point, from said second prediction frame by a comparison of voxel information including said one two-dimensional reference distribution and said another two-dimensional reference distribution related to said reference region and voxel information including said one two-dimensional comparison distribution and said another two-dimensional comparison distribution related to said comparison region.

12. The image processing system according to claim 1, further comprising:
    a first image pickup portion for obtaining a first dynamic image by a first serial image pickup intended for a subject;
    a second image pickup portion for obtaining a second dynamic image by a second serial image pickup intended for said subject in an identical timing to said first serial image pickup;
    a first compressing portion for executing a compression processing over said first dynamic image, thereby generating said first compressed dynamic image; and
    a second compressing portion for executing a compression processing over said second dynamic image, thereby generating said second compressed dynamic image.

13. The image processing system according to claim 1, further comprising:
    a first compressing portion for executing a compression processing over a first dynamic image, thereby generating said first compressed dynamic image; and
    a second compressing portion for executing a compression processing over a second dynamic image, thereby generating said second compressed dynamic image,
    said first and second compressing portions being operated in such a manner that a frame in said first dynamic image and a frame in said second dynamic image corresponding thereto form either a set of said reference frames or a set of said prediction frames.

14. An image processing method executed by an image processing system, said method comprising:
    acquiring, by an acquiring portion of said image processing system, first and second compressed dynamic images, each of said first and second compressed dynamic images comprising a plurality of frames, including a reference frame and a prediction frame, wherein each pixel of said prediction frame is indicated by motion information based on a corresponding frame of a respective compressed dynamic image; and
    executing a detection processing, by a computing portion of said image processing system, with respect to a plurality of sets of frames each set of frames comprising a frame in said first compressed dynamic image and a frame in said second compressed dynamic image corresponding thereto for detecting a corresponding point for each reference point contained in one frame of said first compressed dynamic image, wherein said detected corresponding point is contained in a frame of said second compressed dynamic image, and wherein said detected corresponding point is detected by causing each of said plurality of sets of frames to be a target, said computing portion executing said detection processing for a set of prediction frames contained in said plurality of sets of frames by using motion information indicative of said set of said prediction frames.

15. A non-transitory computer readable recording medium storing a computer-readable program, said program controlling an information processing system to operate as an image processing system, and said image processing system comprising:
    an acquiring portion for acquiring first and second compressed dynamic images, said first and second compressed dynamic images each comprising a plurality of frames, including a reference frame and a prediction frame, and having each pixel of said prediction frame indicated by motion information based on a corresponding frame of a respective compressed dynamic image; and
    a computing portion for carrying out a detection processing for detecting a corresponding point with respect to a plurality of sets of frames each set of frames comprising a frame in said first compressed dynamic image and a frame in said second compressed dynamic image corresponding thereto for each reference point contained in one frame said first compressed dynamic image, wherein said detected corresponding point is contained in a frame of said second compressed dynamic image, wherein said detected corresponding point is detected by causing each of said plurality of sets of frames to be a target,
    said computing portion executing said detection processing for a set of prediction frames contained in said plurality of sets of frames by using motion information indicative of said set of said prediction frames.

* * * * *